(12) United States Patent
Hsu et al.

(10) Patent No.: US 12,487,286 B2
(45) Date of Patent: *Dec. 2, 2025

(54) DIAGNOSTIC TOOL FOR TRAFFIC CAPTURE WITH KNOWN SIGNATURE DATABASE

(71) Applicant: Advantest Corporation, Tokyo (JP)

(72) Inventors: Linden Hsu, San Jose, CA (US); Boilam Phan, San Jose, CA (US); Rotem Nahum, San Jose, CA (US)

(73) Assignee: Advantest Corporation, Tokyo (JP)

( * ) Notice: Subject to any disclaimer, the term of this patent is extended or adjusted under 35 U.S.C. 154(b) by 887 days.

This patent is subject to a terminal disclaimer.

(21) Appl. No.: 17/180,618

(22) Filed: Feb. 19, 2021

(65) Prior Publication Data

US 2021/0173010 A1 Jun. 10, 2021

Related U.S. Application Data

(63) Continuation-in-part of application No. 17/127,596, filed on Dec. 18, 2020, which is a continuation-in-part of application No. 15/981,634, filed on May 16, 2018, now Pat. No. 10,929,260.

(51) Int. Cl.
 *G01R 31/319* (2006.01)
 *G01R 31/3183* (2006.01)
 *G01R 31/3193* (2006.01)

(52) U.S. Cl.
 CPC .......... *G01R 31/31917* (2013.01); *G01R 31/318307* (2013.01); *G01R 31/318314* (2013.01); *G01R 31/31901* (2013.01); *G01R 31/3193* (2013.01)

(58) Field of Classification Search
 CPC ...... G01R 31/31917; G01R 31/318307; G01R 31/318314; G01R 31/31901; G01R 31/3193; G01R 31/2834
 USPC ........................................................ 702/123
 See application file for complete search history.

(56) References Cited

U.S. PATENT DOCUMENTS

| | | | |
|---|---|---|---|
| 7,058,921 B1 * | 6/2006 | Hwang | G06F 30/34 716/138 |
| 7,131,046 B2 | 10/2006 | Volkerink et al. | |
| 9,977,707 B1 * | 5/2018 | Nagabushanam | G06F 11/3068 |
| 10,929,260 B2 * | 2/2021 | Hsu | H04L 43/04 |

(Continued)

FOREIGN PATENT DOCUMENTS

| | | |
|---|---|---|
| TW | 200643449 A | 12/2006 |
| TW | I385405 | 12/2006 |

(Continued)

*Primary Examiner* — Michael P Nghiem

(57) ABSTRACT

A method of identifying error patterns during automated device testing comprises receiving a data pattern from a plurality of capture modules programmed on a programmable logic device, wherein the plurality of capture modules are programmable and operable to selectively capture data traffic to be monitored, and wherein the data traffic comprises a flow of traffic between a DUT and the programmable logic device. The method further comprises comparing the data pattern with known signatures in an error signature database. Also, the method comprises correlating the data pattern with one or more matching known signatures in the error signature database and assigning a score to each of the one or more matching known signatures in the error signature database based a level of correlation.

19 Claims, 15 Drawing Sheets

(56) References Cited

U.S. PATENT DOCUMENTS

| | | | |
|---|---|---|---|
| 2003/0084413 | A1 | 5/2003 | Varney |
| 2004/0225465 | A1 | 11/2004 | Pramanick et al. |
| 2008/0115029 | A1 | 5/2008 | Kusko et al. |
| 2009/0119054 | A1 | 5/2009 | Adachi |
| 2011/0078525 | A1 | 3/2011 | Xia et al. |
| 2014/0006875 | A1 | 1/2014 | Vedula et al. |
| 2014/0236524 | A1* | 8/2014 | Frediani ............ G01R 31/31907 702/108 |
| 2018/0302330 | A1* | 10/2018 | Bush ..................... H04L 47/27 |
| 2019/0018061 | A1 | 1/2019 | Gentner et al. |
| 2019/0353696 | A1* | 11/2019 | Hsu ................. G01R 31/2834 |
| 2019/0354453 | A1* | 11/2019 | Hsu ..................... G06F 11/24 |
| 2020/0033409 | A1* | 1/2020 | Hobbs .............. G11C 29/56016 |
| 2021/0111967 | A1* | 4/2021 | Pham ................ G06F 13/4282 |

FOREIGN PATENT DOCUMENTS

| | | |
|---|---|---|
| TW | 200741213 A | 11/2007 |
| TW | I348026 | 11/2007 |
| TW | 201504647 A | 2/2015 |
| TW | I623763 | 2/2015 |
| TW | 201843589 A | 12/2018 |

* cited by examiner

DIAGNOSTIC TOOL FOR TRAFFIC CAPTURE WITH KNOWN SIGNATURE DATABASE

CROSS-REFERENCE TO RELATED APPLICATIONS

The present application is a continuation-in-part of U.S. patent application Ser. No. 17/127,596, filed Dec. 18, 2020, entitled "GRAPHICAL USER INTERFACE FOR TRAFFIC CAPTURE AND DEBUGGING TOOLS," naming Linden Hsu and Boilam Phan as inventors, which is a continuation-in-part of U.S. patent application Ser. No. 15/981,634, filed May 16, 2018, and now issued as U.S. Pat. No. 10,929,260, entitled "TRAFFIC CAPTURE AND DEBUGGING TOOLS FOR IDENTIFYING ROOT CAUSES OF DEVICE FAILURE DURING AUTOMATED TESTING," naming Linden Hsu, Ben Rogel-Favila, Michael Jones, Duane Champoux and Mei-Mei Su as inventors, filed on May 16, 2018, and which is incorporated herein by reference in their entirety and for all purposes.

This application also claims priority to U.S. Provisional Application 62/985,575, titled "DIAGNOSTIC TOOL FOR TRAFFIC CAPTURE WITH KNOWN SIGNATURE DATABASE," with docket number ATSY-0091-00.00US, filed on Mar. 5, 2020. The entire contents of each of the above-listed applications is hereby incorporated by reference for all purposes as if fully set forth herein.

FIELD OF THE INVENTION

The present disclosure relates generally to the field of electronic device testing systems and more specifically to the field of electronic device testing equipment for testing devices under test (DUTs).

BACKGROUND OF THE INVENTION

Automated test equipment (ATE) can be any testing assembly that performs a test on a semiconductor device or electronic assembly. ATE assemblies may be used to execute automated tests that quickly perform measurements and generate test results that can then be analyzed. An ATE assembly may be anything from a computer system coupled to a meter, to a complicated automated test assembly that may include a custom, dedicated computer control system and many different test instruments that are capable of automatically testing electronics parts and/or semiconductor wafer testing, such as system-on-chip (SOC) testing or integrated circuit testing. ATE systems both reduce the amount of time spent on testing devices to ensure that the device functions as designed and serve as a diagnostic tool to determine the presence of faulty components within a given device before it reaches the consumer.

One of the drawbacks with conventional ATE is that they typically only report pass/fail results. In other words, the ATE only reports whether one or more devices under test (DUTs) passed or failed the respective test being executed. The ATE is not configured to identify root causes of device failure that occur during qualification testing. Typically, the ATE will not have any hardware or software-based tools built into it that would enable engineers to easily diagnose problems with the DUTs.

In a typical testing environment, the engineers operating the ATE will need to identify the cause of failure manually by collecting data logs and performing analysis on the logs. This approach is labor intensive, error prone and not scalable. It may also not yield the desired result since there may not be enough information available to the engineers to determine which data logs to analyze or how to find the root causes of device failure within the data logs. Further, traditional ATE systems do not contain any intelligence built into the hardware that would help engineers capture and automatically interpret and analyze diagnostic information pertaining to the tests.

Also traditional ATE systems do not provide the user with a graphical user interface (GUI) that allows the user to control particularized aspects of the hardware test system and also to synthesize and provide results in a seamless and efficient fashion to the user. Further, traditional ATE systems do not provide a GUI that alerts the user to suspect conditions in the test results that need further attention or that allows the user to add, delete, modify or save suspect conditions. Further, the GUI of conventional tester systems do not provide the user with links between the source data and the flagged conditions.

Conventional tools of debugging hardware systems did not have a way to automatically identify error patterns that are repeatable. For example, if an error pattern identified in a DUT correlated with a known prior error pattern, there was no way to correlate the error pattern with the known pattern previously identified. This caused inefficiencies because each error needed to be debugged afresh without using prior knowledge accumulated regarding the causes of the respective error and ways in which to correct for it.

BRIEF SUMMARY OF THE INVENTION

Accordingly, a need exists for an ATE that comprises hardware-based traffic capture modules that automatically collect and monitor data being exchanged between a tester and a device under test (DUT) in order to collect valuable information regarding the state of the tester over time and the data being exchanged between the tester and the DUT. Further, a need exists for both hardware and software-based tools that allow engineers to more easily interpret collected data and, in particular, a graphical user interface that, among other things, allows the user to program the hardware-based logic modules to perform specific functions and also to display the test data in an intuitive and efficient manner.

Finally, a need exists for tools of debugging hardware systems that automatically identify error patterns that are repeatable. For example, if an error pattern identified in a DUT correlated with a known prior error pattern, embodiments of the present invention provide a way to correlate the newly identified error pattern with the known pattern previously identified to diagnose the error cause. This is advantageously efficient because using prior knowledge accumulated regarding the causes of the respective error and their remedies prevents each error from needing to be debugged afresh.

Embodiments of the present invention also provide an integrated GUI that allows a user to control all aspects of the test flow and provides the user with information pertaining to the test results in an easy to comprehend fashion. In one implementation, the GUI not only collects and aggregates data from the hardware-based logic modules but also from various points in the tester system.

Embodiments of the present invention further create and maintain a database of known error signatures and/or signatures associated with known issues that have already been identified and obtained from a hardware debug tool, e.g., a hardware debug tool associated with the hardware-based traffic capture modules for instance. In addition to the error signature, the database also stores the cause of the error signature. The error signatures (and signatures associated with known issues) can initially be captured through any mechanism, including manual identification, via automatic data capture and/or from the integrated GUI. Advantageously, the known signatures (and cause descriptions) are then placed into the database that can be scanned automatically with respect to an unknown signature for identification of a cause thereof.

In one embodiment, a method of identifying error patterns during automated device testing is disclosed. The method comprises receiving a data pattern from a plurality of capture modules programmed on a programmable logic device, wherein the plurality of capture modules are programmable and operable to selectively capture data traffic to be monitored, wherein the data pattern may result from an error, and wherein the data traffic comprises a flow of traffic between a DUT and the programmable logic device. The method further comprises comparing the data pattern with known signatures in an error signature database. Further, the method comprises correlating the data pattern with one or more matching known signatures in the error signature database and assigning a score to each of the one or more matching known signatures in the error signature database based a level of correlation.

In another embodiment, an apparatus for identifying error patterns during automated device testing is disclosed. The apparatus comprises a programmable logic device communicatively coupled to a device under test (DUT) operable to generate commands and data for executing a test on the DUT, wherein the programmable logic device comprises a plurality of programmable capture modules programmed on the programmable logic device, wherein the plurality of capture modules are operable to monitor data traffic between the DUT and the programmable logic device, and wherein the plurality of capture modules are operable to selectively capture data traffic to be monitored. The apparatus further comprises a monitoring application operable to receive the data traffic and configured to: a) based on user input, program the plurality of capture modules; b) retrieve results associated with monitoring the data traffic from respective memories associated with each of the plurality of capture modules into the monitoring application; c) identify a data pattern from the retrieved results; d) compare the data pattern with known signatures in an error signature database; and e) correlate the data pattern with one or more matching known signatures in the error signature database.

In one embodiment, a tester comprises a system controller for controlling a test program for testing a plurality of DUTs. The tester also comprises a Field Programmable Gate Array (FPGA) operable to interface with and test the plurality of DUTs, the FPGA coupled to the system controller, wherein each FPGA comprises a plurality of capture modules, wherein the plurality of capture modules comprise different types and are programmed on the FPGA and operable to monitor data traffic between the plurality of DUTs and the FPGA, wherein the plurality of capture modules are operable to selectively capture and analyze data traffic to be monitored, wherein the data traffic comprises a flow of traffic between the plurality of DUTs and the FPGA. Further, the tester comprises a monitoring application operable to implement a graphical user interface and configured to: a) based on user input, program the plurality of capture modules; b) retrieve results associated with monitoring the data traffic from respective memories associated with each of the plurality of capture modules into the monitoring application; c) identify a data pattern from the retrieved results; d) compare the data pattern with known signatures in an error signature database; and e) correlate the data pattern with one or more matching known signatures in the error signature database.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

Figure 1:
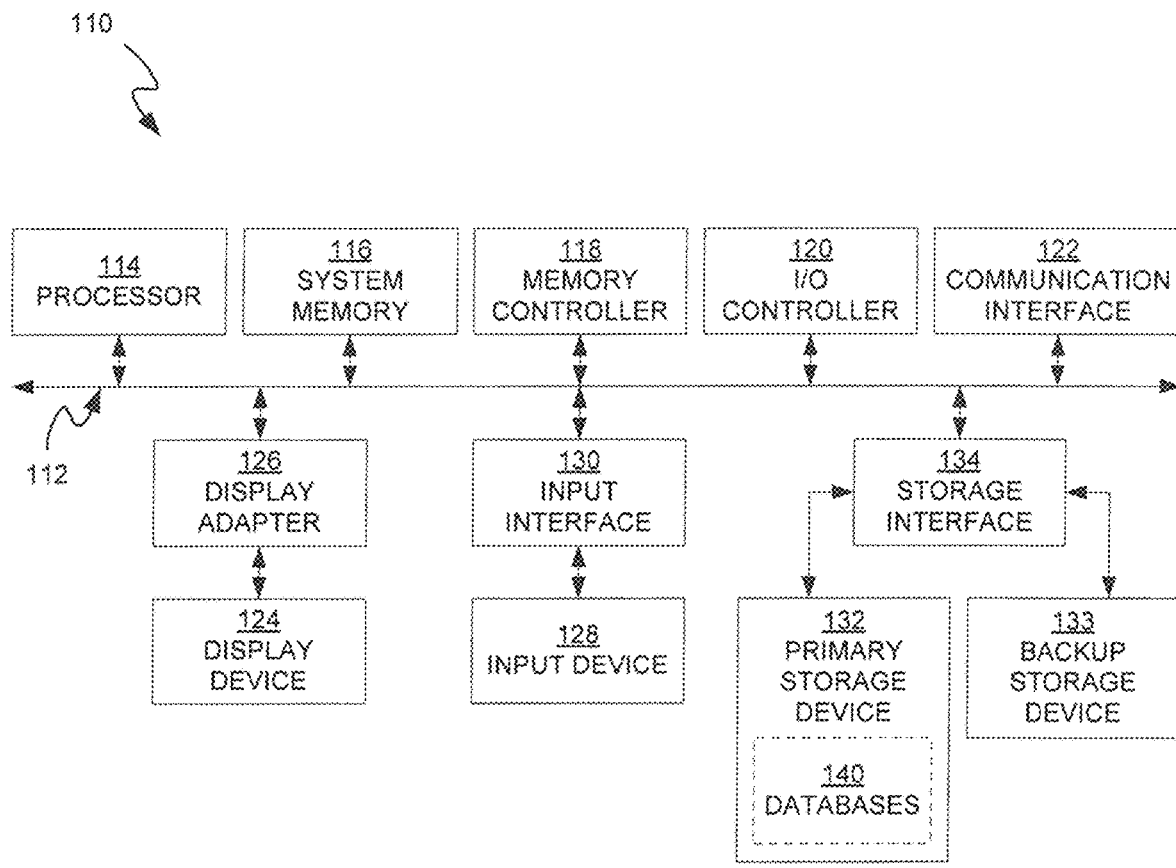
FIG. 1 is a computer system on which embodiments of the automated test system of the present invention can be implemented in accordance with one embodiment of the present invention.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "configuring," "providing," "executing," "transmitting," "obtaining," "implementing," "programming," "allocating," "associating," "setting," "accessing," "retrieving," "saving," "capturing," "generating," "completing," "monitoring," "controlling," "determining," "identifying," "caching," "maintaining," "comparing," "removing," "reading," "writing," or the like, refer to actions and processes (e.g., flowchart 700 of FIGS. 7 and 12) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a tester control system 110 capable of supporting hardware and software-based traffic capture and debug tools that help identify root cause of device failures. For example, system 110 may connect to FPGA-based tester modules, wherein the FPGAs comprise capture logic to collect information pertaining to the state of the tester and to the information being exchanged between the respective FPGAs and connected DUTs. Tester control system 110 broadly represents any single or multi-processor computing device or system capable of executing computer-readable instructions. Examples of control system 110 include, without limitation, workstations, laptops, client-side terminals, servers, distributed computing systems, handheld devices, or any other computing system or device. In its most basic configuration, control system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments control system 110 may include both a volatile memory unit (such as, for example, system memory 116) and a non-volatile storage device (such as, for example, primary storage device 132).

Tester control system 110 may also include one or more components or elements in addition to processor 114 and system memory 116. For example, in the embodiment of FIG. 1, control system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of control system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of control system 110, such as processor 114, system memory 116, communication interface 122, display adapter 126, input interface 130, and storage interface 134.

Communication interface 122 broadly represents any type or form of communication device or adapter capable of facilitating communication between example control system 110 and one or more additional devices. For example, communication interface 122 may facilitate communication between control system 110 and a private or public network including additional control systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between control system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow control system 110 to engage in distributed or remote computing. For example, communication interface 122 may receive instructions from a remote device or send instructions to a remote device for execution.

As illustrated in FIG. 1, control system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, control system 110 may also include at least one input device 128 coupled to communication infrastructure 112 via an input interface 130. Input device 128 generally represents any type or form of input device capable of providing input, either computer- or human-generated, to control system 110. Examples of input device 128 include, without limitation, a keyboard, a pointing device, a speech recognition device, or any other input device.

As illustrated in FIG. 1, control system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of control system 110.

In one example, databases 140 may be stored in primary storage device 132. Databases 140 may represent portions of a single database or computing device or it may represent multiple databases or computing devices. For example, databases 140 may represent (be stored on) a portion of control system 110 and/or portions of example network architecture 200 in FIG. 2 (below). Alternatively, databases 140 may represent (be stored on) one or more physically separate devices capable of being accessed by a computing device, such as control system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into control system 110. For example, storage devices 132 and 133 may be configured to read and write software, data, or other computer-readable information. Storage devices 132 and 133 may also be a part of control system 110 or may be separate devices accessed through other interface systems.

Many other devices or subsystems may be connected to control system 110. Conversely, all of the components and devices illustrated in FIG. 1 need not be present to practice the embodiments described herein. The devices and subsystems referenced above may also be interconnected in different ways from that shown in FIG. 1. Control system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into control system 110. All or a portion of the computer program stored on the computer-readable medium may then be stored in system memory 116 and/or various portions of storage devices 132 and 133. When executed by processor 114, a computer program loaded into control system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
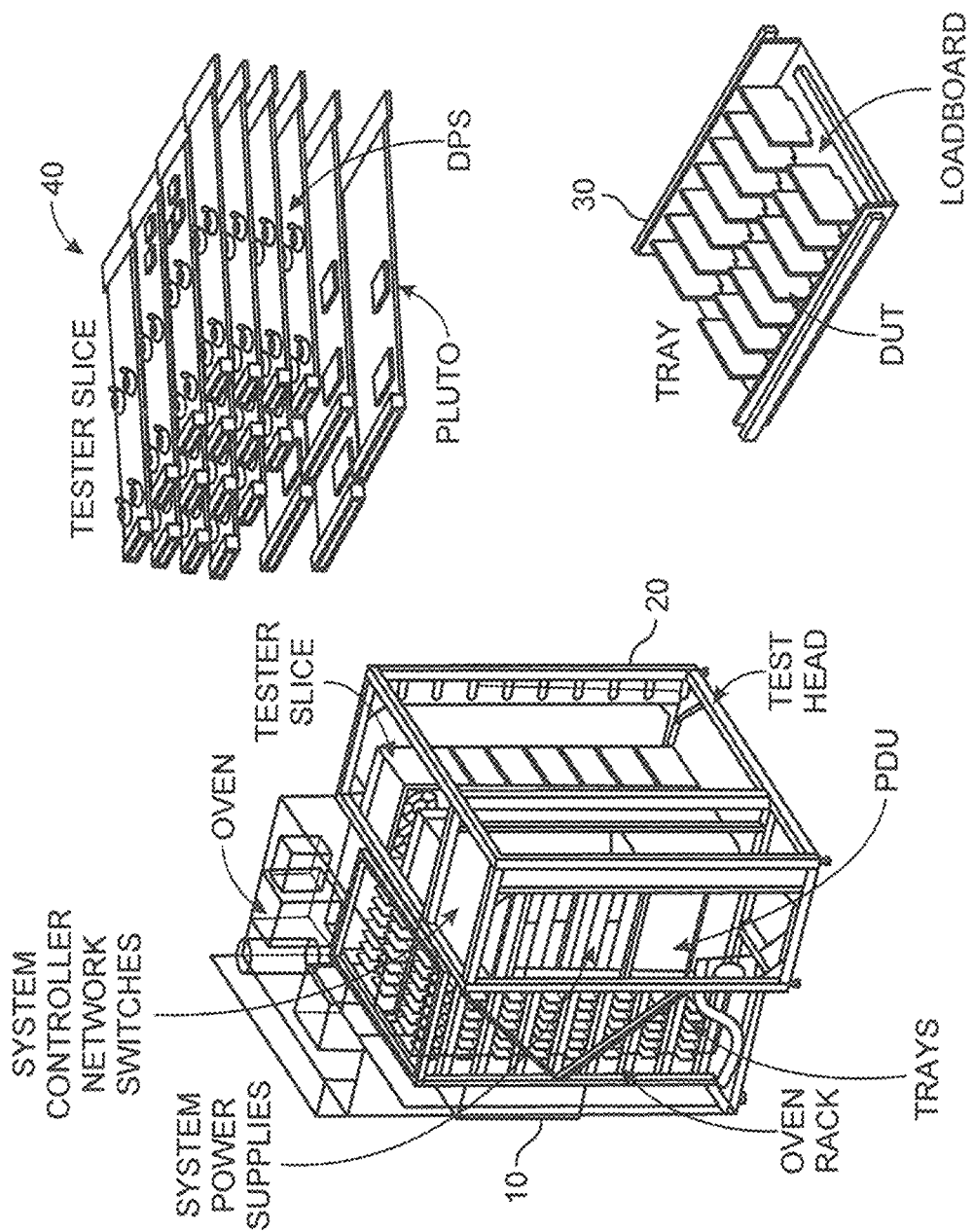
FIG. 2 illustrates a typical testing environment in which DUTs are placed into a controlled environmental chamber.

Traffic Capture and Debugging Tools for Identifying Root Causes of Device Failure During Automated Testing FIG. 2 illustrates a typical testing environment in which DUTs may be placed into a controlled environmental chamber 10 or "oven." The DUTs are connected to tester slices of a test head 20. Many DUTs can be connected to a single tester slice 40. The tester slices contain the test circuitry, which performs tests on the DUTs in accordance with a test plan. There can be many tester slices per test head 20. The DUTs are placed into trays 30 when inserted into the oven 10. In a typical environmental chamber, the plurality of tester slices operate in lock step executing the same test plan on the plurality of DUTs. Further, the test head is typically controlled by a single controller computer system (e.g. tester control system 110) that is directly connected to the test head and, in this fashion, controls all of the slices of the test head 20. The controller computer is typically operated by a single user executing a single test plan on the DUTs. As will be described further below, each tester slice comprises FPGAs onto which the traffic capture and debugging modules of the present invention can be programmed. For example, the FPGAs can be programmed with logic and buffers that collects information pertaining to the state of the FPGAs and the data being exchanged between the FPGAs and any connected DUTs.

Figure 3:
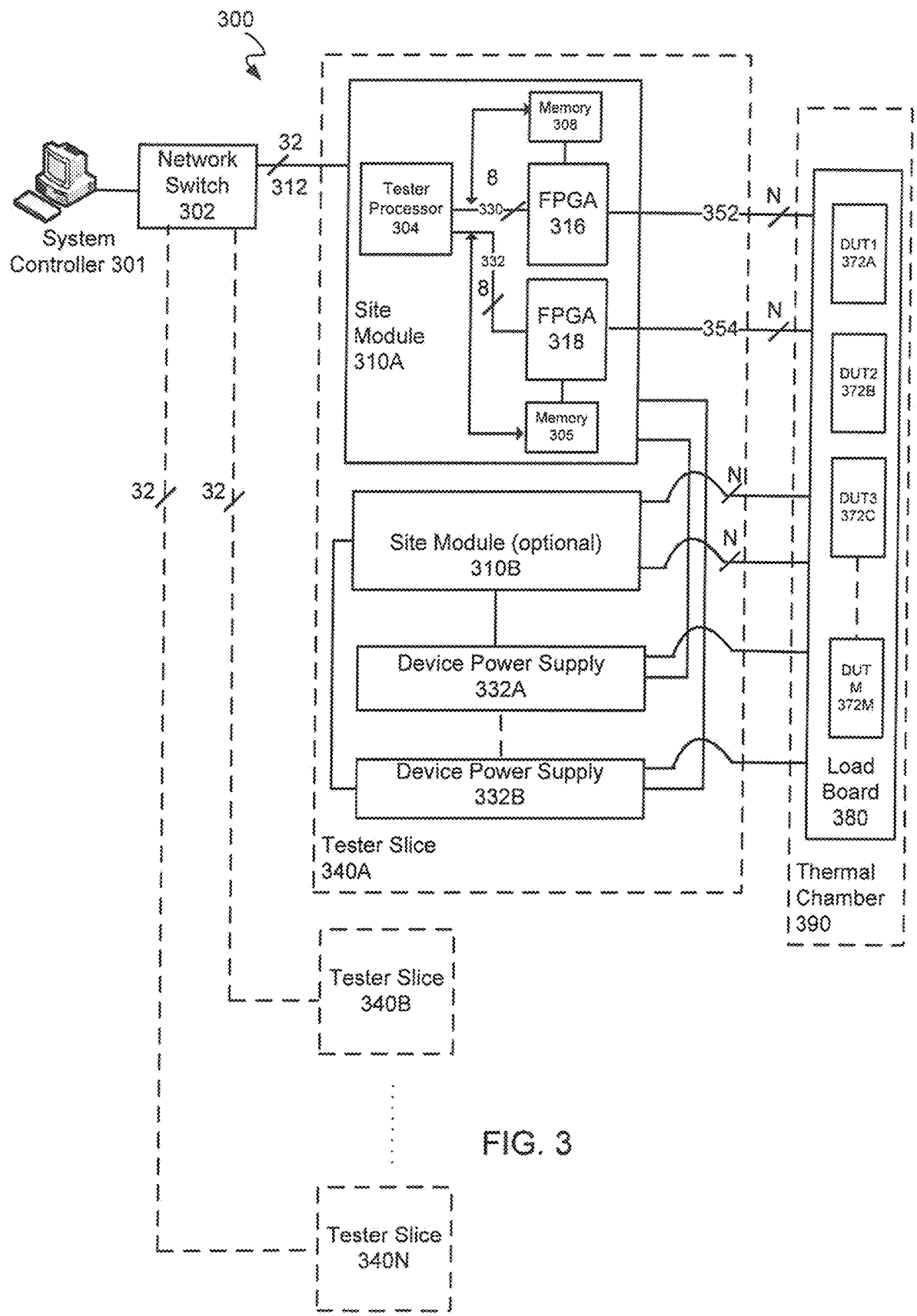
FIG. 3 is a detailed schematic block diagram illustrating an exemplary embodiment of a tester slice and its interconnections with the system controller and the DUTs.

FIG. 3 is a detailed schematic block diagram illustrating an exemplary embodiment of a tester slice and its interconnections with the system controller and the DUTs.

Referring to FIG. 3, each tester slice comprises site modules. The site modules, in one embodiment, can be mechanically configured onto tester slices 340A, 340B . . . 340N, wherein each tester slice comprises at least one site module. In certain typical embodiments, each tester slice can comprise two site modules and two device power supply boards. In other embodiments, the tester slice may comprise more or fewer site modules and/or power supply boards. Tester slice 340A of FIG. 3, for example, comprises site modules 310A and 310B and device power supplies 332A and 332B. However, there is no limit to the number of device power supply boards or site modules that can be configured onto a tester slice. Tester slices 340A (and 340B) are connected to system controller 301 through network switch 302. Network switch 302 can be connected to each of the site modules with a 32 bit wide bus.

In one embodiment, the system controller 301 may be a computer system, e.g., a personal computer (PC) that provides a user interface for the user of the ATE to load the test programs and run tests for the DUTs connected to the ATE 300. The Advantest Stylus Operating System is one example of test software normally used during device testing. It provides the user with a graphical user interface from which to configure and control the tests. It can also comprise functionality to control the test flow, control the status of the test program, determine which test program is running, and log test results and other data related to test flow. In one embodiment, the system controller can be connected to and control as many as 512 DUTs.

In one embodiment, the system controller 301 can be connected to the site module boards 310A-310B through a network switch, such as an Ethernet switch. In other embodiments, the network switch may be compatible with a different protocol such as Fibre Channel, 802.11 or ATM, for instance.

Each of the device power supply boards 332A-332B can be controlled from one of the site modules 310A-310B. The software running on the tester processor 304 can be configured to assign a device power supply to a particular site module. In one embodiment, the site modules 310A-310B and the device power supplies 332A-332B are configured to communicate with each other using a high speed serial protocol, e.g., Peripheral Component Interconnect Express (PCIe), Serial AT Attachment (SATA) or Serial Attached SCSI (SAS), for instance.

In one embodiment, each site module is configured with two FPGAs as shown in FIG. 3. Each of the FPGAs 316 and 318 in the embodiment of FIG. 3 is controlled by the tester processor 304. The tester processor 304 can communicate with each of the FPGAs using a 8 lane high speed serial protocol interface such as PCIe as indicated by system buses 330 and 332 in FIG. 3. In other embodiments, the tester processor 304 could also communicate with the FPGAs using different high speed serial protocols, e.g., Serial AT Attachment (SATA) or Serial Attached SCSI (SAS).

FPGAs 316 and 318 are connected to memory modules 308 and 305 respectively. The memory modules can be coupled with and can be controlled by both the FPGA devices and the tester processor 304.

FPGAs 316 and 318 can be connected to the DUTs 372A, 372B, 372C, . . . 372M on the load board 380 through buses 352 and 354 respectively. The load board 380 is a physical harness that allows a general purpose high speed connection at the site module end that is agnostic to the protocol used to communicate to the DUTs in on lines 352 and 354. At the DUT end, however, the load board needs to be designed so as to have connectors specific to the protocol being used by the DUT.

It should be noted that FIG. 3 only illustrates an exemplary embodiment of a tester slice. Further, note that embodiments of the present invention are not limited to only the type of tester slices shown in FIG. 3. Embodiments of the present invention can include many different types of tester slices and primitives. Each tester slice will, however, comprise FPGAs onto which the traffic capture and debug modules of the present invention can be programmed regardless of the configuration of the tester slice.

The DUTs 372A-372M, in one embodiment of the invention, are loaded on a load board 380 that is placed inside a thermal chamber 390 for testing. The DUTs 372A-372M and the load board 380 derive power from the device power supplies 332A and 332B.

The number of DUTs that can be connected to each FPGA is contingent on the number of transceivers in the FPGA and the number of I/O lanes required by each DUT. In one embodiment, FPGAs 316 and 318 can each comprise 32 high speed transceivers and buses 352 and 354 can each be 32 bits wide, however, more or less can be implemented depending on the application. If each DUT requires 8 I/O lanes, for example, only 4 DUTs can be connected to each FPGA in such a system.

The tester processor 304 is connected to and can communicate with the system controller 301 over bus 312. In one embodiment, tester processor 304 communicates with each of the FPGA devices 316 and 318 over a separate dedicated bus (e.g., 330 and 332 respectively). In one embodiment, tester processor 304 can control the testing of the DUTs 372A-372N transparently through the FPGAs with minimal processing functionality allocated to the FPGA devices. In this embodiment, the data traffic capacity of buses 330 and 332 can be exhausted rapidly because all the commands and data generated by the tester processor need to be communicated over the bus to the FPGA devices. In other embodiments, the tester processor 304 can share the processing load by allocating functionality to control the testing of the DUTs to the FPGA devices. In these embodiments, the traffic over buses 330 and 332 is reduced because the FPGA devices can generate their own commands and data.

In one embodiment, each of the FPGA devices, e.g., 316 and 318 is connected to its own dedicated memory block, e.g., 308 and 304. These memory blocks can, among other things, be utilized to store the test pattern data that is written out to the DUTs. In one embodiment, each of the FPGA devices can comprise two or more instantiated FPGA tester blocks (not shown) with functional modules for performing functions including implementation of communicative protocol engines and hardware accelerators.

Further, each of the DUTs 372A-372M in the system can be connected to a dedicated instantiated FPGA tester block in a "tester per DUT" configuration, wherein each DUT gets its own instantiated tester block. This allows separate test execution for each DUT. The hardware resources in such a configuration are designed in a manner to support individual DUTs with minimal hardware sharing. This configuration also allows many DUTs to be tested in parallel, where each DUT can be connected to its own dedicated FPGA tester block within the FPGA and be running a different test program.

The architecture of the embodiment of the present invention depicted in FIG. 3 has several advantages. First, it eliminates the need for protocol-specific bus adapter sockets and cards in the system because the communication protocol modules can be programmed directly on the instantiated FPGA tester blocks within the FPGA devices. The instantiated tester blocks can be configured to communicate with the DUTs in any protocols that the DUTs support. Accordingly, if DUTs with different protocol support need to be tested, they can be connected to the same system and the FPGAs can be reprogrammed with support for the associated protocols. As a result, one ATE body can be easily configured to test DUTs supporting many different types of protocols.

In one embodiment, new protocols can be downloaded and installed directly on the FPGAs via a simple bit-stream download from a cache on system controller 301 without any kind of hardware interactions. An FPGA will typically include a configurable interface core (or IP core) that is programmable to provide functionality of one or more protocol based interfaces for a DUT and is programmable to interface with the DUT. For example, the FPGAs 316 and 318 in the ATE apparatus will include an interface core that can be configured with the PCIe protocol to test PCIe devices initially and subsequently reconfigured via a software download to test SATA devices. Also, if a new protocol is released, the FPGAs can easily be configured with that protocol via a bit-stream download instead of having to physically switch all the hardware bus adapter cards in the system. Finally, if a non-standard protocol needs to be implemented, the FPGAs can nonetheless be configured to implement such a protocol.

In another embodiment, the FPGAs can be configured to run more than one communicative protocol, wherein these protocols also can be downloaded from system controller 301 and configured through software. In other words, each FPGA implements custom firmware and software images to implement the functionality of one or more PC based testers in a single chip. The required electrical signaling and protocol-based signaling is provided by on-chip IP cores in the FPGAs. As mentioned above, each FPGA is programmable with pre-verified interface or IP cores. This ensures compliance and compatibility according to a given interface standard. The programmable nature of the FPGA is utilized to optimize flexibility, cost, parallelism and upgradeabilty for storage testing applications from SSDs, HDDs and other protocol based storage devices.

For instance, an instantiated FPGA tester block within FPGA 316 can be configured to run the PCIe protocol while a different instantiated FPGA tester block within the same FPGA 316 can be configured to run the SATA protocol. This allows the tester hardware to test DUTs supporting different protocols simultaneously. FPGA 316 can now be connected to test a DUT that supports both PCIe and SATA protocols. Alternatively, it can be connected to test two different DUTs, one DUT supporting the PCIe protocol and the other DUT supporting the SATA protocol, where each instantiated functional module within the FPGA is configured with a protocol to test the respective DUT it is connect to.

In one embodiment, the interface or IP core in the FPGA may be acquired from a third party vendor but may require some customization to be compatible with the embodiments described herein. In one embodiment, the interface core provides two functions: a) wraps storage commands into a standard protocol for transmission over a physical channel; and 2) is the electrical signal generator and receiver.

Figure 4:
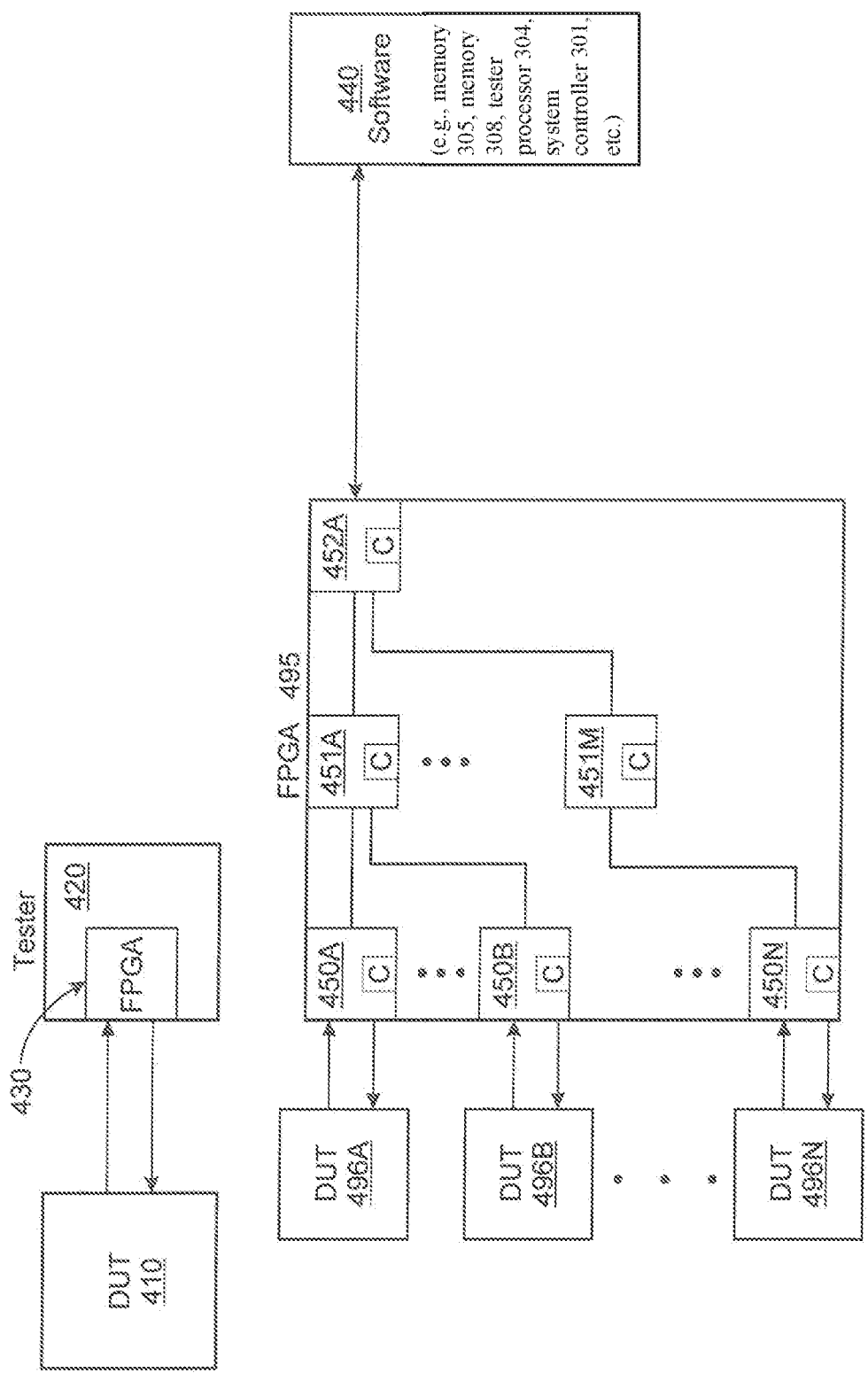
FIG. 4 is a high-level block diagram illustrating the manner in which the traffic capture modules of the present invention collect diagnostic information pertaining to automated testing in accordance with an embodiment of the present invention.

FIG. 4 is a high-level block diagram illustrating the manner in which the traffic capture modules of the present invention collect diagnostic information pertaining to automated testing in accordance with an embodiment of the present invention. By "traffic," what is meant is signal traffic over the various buses being monitored.

As shown in FIG. 4, each tester 420 (or tester slice) comprises at least one FPGA 430 that is in communication with at least one DUT 410. As shown in FIG. 3, typically each FPGA will communicate with multiple DUTs.

Embodiments of the present invention add traffic capture logic modules to the FPGA, e.g., 450A, 450B, . . . 450N, 451A . . . 451M and 452A, in order to collect information such as the state of the tester 420 over time (including the FPGA 430) and data being exchanged between the tester 420 and the DUT over time. The traffic capture logic modules are fully programmable and can be programmed to perform a range of functions. Using traffic capture modules allows the tester to advantageously collect information pertaining to device failure within modules and buffers inside the tester firmware itself. It should be noted that the invention herein is not limited to FPGAs, e.g., the capture modules of the present invention can be programmed onto other types of programmable logic devices as well.

Currently, debug tools are being developed in the testing industry for easier interpretation of collected data. The tools are mostly software-based and are geared towards organizing collected data in a context relevant manner, which allows the expert to more easily identify issues. However, these approaches are still fairly labor intensive because they require an engineer to manually review testing logs and files.

Embodiments of the present invention advantageously add analysis capability within the logic modules of the hardware, e.g., inside the FPGA. For example, the capture logic modules and buffers can be programmed to monitor for device failure precursors. The failure precursors provide an indication regarding DUTs that are potentially going to fail. Previously, an engineer would have to manually review several logs to determine information regarding impending device failure. Embodiments of the present invention advantageously build in the capability to identify and alert the engineer regarding potential device failures within the firmware. The traffic capture modules analyze the debug data in real time. Further, the traffic capture modules identify suspicious conditions and flag them upon logging for a person to examine or software to analyze at a later time.

In one embodiment, the traffic capture and debug tools of the present invention comprise a collection of FPGA logic (firmware) and software-based tools that advantageously work together help identify causes, e.g., root causes, of device failure. The logic modules programmed onto the FPGAs monitor and capture: (1) traffic or proxies of traffic exchanged between the tester and respective DUTs; (2) configuration commands used to configure the tester or the respective DUTs; and (3) states within the tester. Further, during the testing process, occasionally errors or unforeseen behavior may occur within the FPGA, which can be captured by the capture modules. Additionally, logic within the capture modules also check for failure precursors and flag them as they get logged. The automated software-based debugging tools included within software 440 can extract the capture results from the capture modules, e.g., 450A-450N, 451A-451M, etc., organize the data, and display the root cause.

In a typical test configuration, the FPGA 430 will write a predetermined pattern to the DUT 410, read the pattern back from the DUT 410, and compare the two in order to determine if the DUT is functioning properly. As mentioned in reference with FIG. 3, each FPGA can be configured to execute a different protocol, e.g., the PCIe protocol and can further be configured to generate commands and data to test one or more connected DUTs.

The capture modules of the present invention allow the exchange of data and commands between the FPGAs and the DUTs to be automatically captured and monitored to check for aberrations. An FPGA 430 can communicate with one or multiple DUTs at the same time. Accordingly, each FPGA may comprise multiple capture modules at the first stage, e.g., 450A-450N, each of which is configured to communicate with a discrete DUT, e.g., DUT 496A, DUT 496B DUT 496N. The information gathered from the DUTs can flow upstream through one or more stages till it is communicated to the software 440.

For example, the FPGA illustrated in FIG. 4 comprises three stages. Data is communicated from the DUTs to the capture modules in the first stage, e.g., 450A-450N. Subsequently, the data flows through the second stage comprising exemplary capture modules 451A-451M. From there, the data passes through the final stage comprising capture module 452A before it is communicated to the software. It should be noted that embodiments of the present invention are not limited to a particular number of stages or a particular number of capture modules. An FPGA can comprise one or more stages, with each stage comprising one or more capture modules, depending on the complexity of the FPGA and the test to be performed. Typically, however, the data captured from the DUTs will be communicated upstream to the software 440 using multiple stages of capture modules and buffers.

The capture modules in each stage within the FPGA will typically have a different configuration from the capture modules in other stages. For example, the capture modules in the first stage, e.g., 450A-450N of the FPGA illustrated in FIG. 4 will be configured to communicate with and collect data from the DUT directly. The capture modules in the second stage, e.g., 451A-451M are configured to have properties similar to switches because they route the data collected from the DUTs to the software block 440. Finally, the capture modules in the third stage of FPGA 495 are configured to transfer the information gathered from the DUTs to the software module 440 and, further, to transfer data and commands downstream from the software 440 to the DUTs. Disseminating capture modules throughout the FPGA allows any errors or unforeseen behavior by the FPGA to be readily captured and analyzed.

In one embodiment, the capture cells can be used to convey information between the DUTs 496A-496N and the software 440. For instance, the software 440 can send commands and data downstream to the DUTs through the chain of capture modules. Further, the DUTs can send responses to the software 440 upstream through the chain of capture modules. The capture modules are programmable and have the necessary logic to identify and flag any error condition that may occur during any stage of the communication. For example, while transmitting information upstream, capture module 451M may encounter an error condition. Capture module 451M may contain logic circuitry to determine whether the error condition is related to the DUT it received the information from or whether the error is related to the switch programmed into capture module 451M.

Alternatively, capture module 451M may be programmed to analyze the data received from a connected DUT, e.g., 469N, and identify a device failure precursor. In other words, capture module 451M may be programmed to use the data gathered from the DUT to indicate that the DUT will fail imminently. Capture module 451M may then flag an error condition or a potential error condition and relay information pertaining to the error to software 440 so the user can be alerted.

In one embodiment, capture modules may also contain logic circuitry and be programmed to analyze the information captured and identify a root cause of error. For example, the capture module may be programmed with a rule checker that is run on the information collected. In other words, the rule-checker can parse through all the failure related information captured to identify some possible causes of the failure by running a set of rules on the information captured.

In one embodiment, there may be several different types of capture logic modules programmed into the FPGA, wherein each capture module is programmed to serve a different purpose.

For example, if the DUTs are PCIe devices, one or more of the capture modules can comprise Transaction Layer Packet (TLP) capture modules. Transaction layer packets are exchanged between a host and a client (or between a tester and a device under test) using the PCIe protocol and the capture module in the FPGA may, for example, capture these TLPs for further inspection and to collect failure related information.

Another type of capture module may be programmed as a Link Training Status State Machine (LTSSM) Capture module. The LTSSM capture module comprises FPGA logic that logs LTSSM events. The LTSSM defines the states machine that the physical and link layer states in the PCIe protocol go through in order to communicate from one end point to another. These states can be captured and analyzed using capture module logic within an FPGA. For example, the capture module may be able to identify and capture the different states the IP core of the FPGA is transitioning through in the execution of the PCIe protocol. If there is a failure in transitioning to an expected state or if a failure occurs while processing a particular state, the capture module will capture the information and transmit it to software 440 for further analysis. Alternatively, in one embodiment, the capture module may contain further logic circuitry to analyze the error condition, e.g., using a rule-checker and determine the root cause of error. The diagnostic information can then be transmitted to the software 440 to relay to the user.

Another type of capture module can comprise a NAK Capture module. NAK is an abbreviation for negative acknowledgement or not acknowledged. It is a signal used in digital communications to ensure that data is received with a minimum of errors. One type of capture module comprises logic that logs NAK events.

In one embodiment, a capture module can comprise an Activity Capture module. An Activity Capture module comprises FPGA logic that logs activity detection events. If there is any activity detected on the incoming or outgoing lines, the activity detection capture module will log such events to present to the user.

In one embodiment, a capture module can comprise an Equalization Capture module. The Equalization Capture module logs equalization events. Equalization can be performed for the PCIe protocol by adjusting the signals on a transmitter and receiver so that the integrity of the data communicated can be maintained. The capture module will monitor the PCIe IP core to determine the manner in which equalization is progressing. In other words, the capture module will monitor the IP core to determine which settings are being requested and used for purposes of equalization and whether they are being accepted. If there is suspicious activity or any illegal values being set, the activity can be captured and flagged and reporter to the user through software module 440.

In one embodiment, a capture module can comprise a Completion Capture module. The Completion Capture module is designed to log a latency between a read request and completion of the read.

In one embodiment, a capture module can comprise an Enhanced Advanced Error Reporting (AER) Capture module. This capture module comprises logic that reports the number of occurrences of Advanced Error Reporting (AER) events. Advanced Error Reporting is a feature of the PCIe protocol and, therefore, this would be a type of capture module programmable in an FPGA running the PCIe protocol.

In one embodiment, a capture module can comprise a Register Access Capture module. A Register Access Capture module comprises FPGA logic that logs the read/write access of control and status registers.

In one embodiment, a capture module can comprise a Traffic Filtering Capture module. A Traffic Filtering Capture module selectively reduces the amount of traffic that the TLP Capture modules will collect. Because buffer space inside the FPGA is limited, a Traffic Filtering Capture module may be used in conjunction with the TLP Capture module to filter or selectively choose a subset of the packets that would be of most interest to the user for diagnostic purposes.

In one embodiment, a capture module can comprise a Traffic Triggering Capture module. A Traffic Triggering Capture module comprises FPGA logic that stops a capture based upon a detected event. In other words, if a user wanted to stop capturing traffic after detecting a particular condition, a Traffic Triggering Capture module can be programmed onto the FPGA.

In one embodiment, a capture module can comprise an Enhanced Data Logging Capture module. This capture module comprises FPGA logic that compares the expected versus received data and displays the results to the user by sending them to software block 440.

In another embodiment, a capture module can comprise an LTSSM Rules Checking module. This type of capture module in PCIe devices is programmed with FPGA logic to determine if the LTSSM state transitions are normal. The LTSSM Rules Checking capability can also be programmed into post-processing software (e.g., within software 440) in cases where it may be more efficient to perform rules-checking using software rather than hardware modules.

Figure 5:
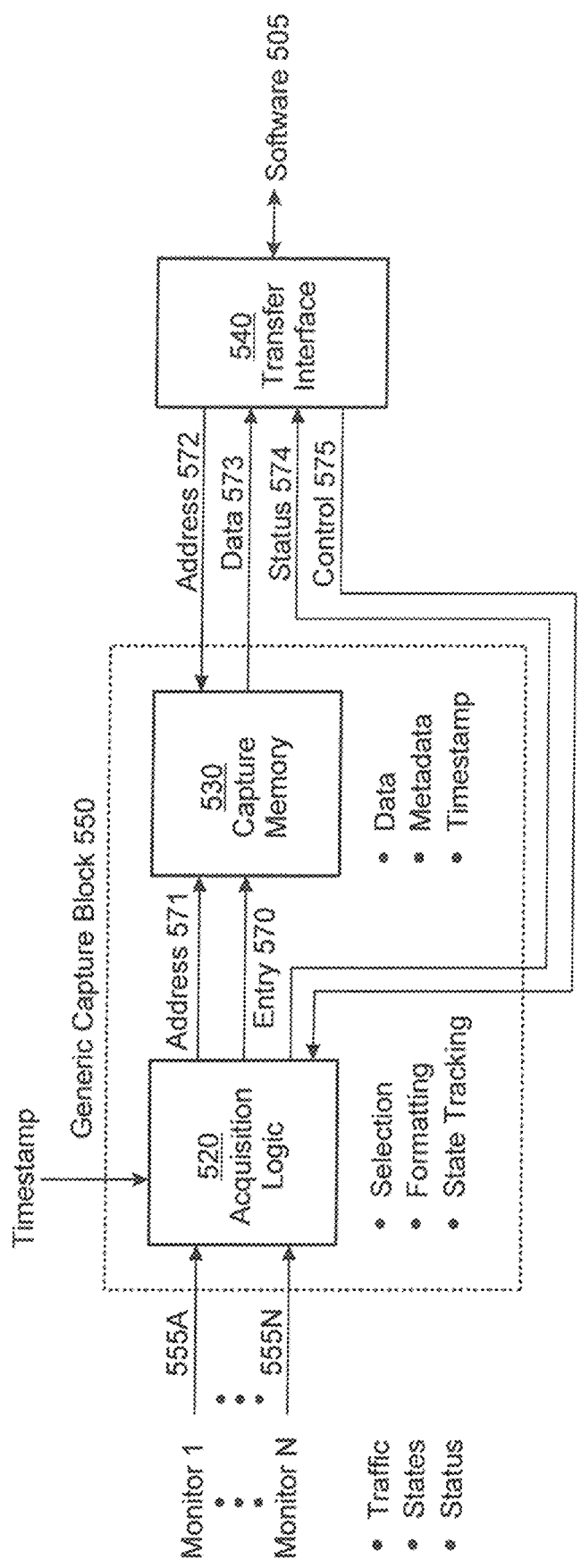
FIG. 5 is a block diagram illustrating the manner in which the traffic capture modules of the present invention are programmed in accordance with an embodiment of the present invention.

FIG. 5 is a block diagram illustrating the manner in which the traffic capture modules of the present invention are programmed in accordance with an embodiment of the present invention. It should be noted that the Capture Block 550 illustrated in FIG. 5 is exemplary. Different types of capture modules may be programmed or configured differently depending on their function.

A typical capture module, e.g., capture module 550 can comprise one or more inputs. For example, each of the inputs, Monitor 1 555A through Monitor N 555N is a discrete input relating to data traffic, states or status that the capture block is programmed to monitor.

The acquisition logic 520 of the capture block selects and captures the information regarding the traffic, states or status and formats them in a desirable order (based on the programming) so that it can be saved in capture memory 530. The acquisition logic block 520 can also selectively capture the desired data. In other words, the acquisition logic block may be programmed to gather only a subset of data inputted through the monitor signals 555A-555N. Certain configuration bits can be programmed into the acquisition block logic that specifies how much of the incoming data should be captured, e.g., in certain instances only the headers of the incoming packets may need to be captured.

In one embodiment, the capture module may only capture certain types of data, e.g., data packets with a particular bit configuration. The acquisition logic 520 can be programmed to selectively capture only the desired data packets while ignoring the rest. In one embodiment, a pre-filtering module (not shown) can be added to the capture block that precedes the acquisition logic block 520 and selectively filters the incoming data.

As a result, the acquisition logic block 520 has access to the format of the data collected. Further, the acquisition logic block 520 can also perform state-tracking, e.g., for LTSSM events. As noted above, the LTSSM defines the state machine that the physical and link layer states in the PCIe protocol go through in order to communicate from one end point to another.

The information acquired by the acquisition logic block 520 can be transferred to the capture memory 530, wherein each entry 570 stored in the memory 530 is accompanied with an address 571. As mentioned earlier, the acquisition logic block 520 has access to the format of the monitored information and can use this to create entries to be stored within memory 530. Typically, the acquisition logic 520 will determine the address 571 within the memory 530 to save the information. In one embodiment, discrete information is captured during each clock cycle and an entry into memory 530 is created for each clock cycle. For example, a TLP Capture block may capture a TLP packet each clock cycle and create a new entry in the memory module for each TLP packet. When TLP packets are larger than 256 bits, each TLP packet may span multiple entries in the capture memory 530.

In different embodiments, certain types of data may take multiple clock cycles to capture. Accordingly, an entry is created in memory 530 for such types of data when all the data regarding a particular event has been collected.

In one embodiment, the acquisition logic block 520 may comprise a simple state machine that formats the data from the monitors to generate entries and addresses to be stored in the memory 530. The state machine further increments the address for the next entry. The state machine may also have additional states depending on the type of capture module. For example, a Traffic Triggering capture block may have additional states related to the triggering of an event.

In one embodiment, memory 530 can comprise a circular buffer to store the entries and accompanying addresses received from the acquisition logic module 520. The number of entries and their frequency depends on the type of capture block. For example, a capture module like the TLP capture may need to store an entry in memory 530 for every transaction layer packet. On the other hand, a capture block that is monitoring states may only create an entry when a state change is detected. Typically, a timestamp is associated with each entry when it saved in the capture memory 530. This allows the data to be sorted easily. This is especially convenient after data from the various capture modules in the FPGA have been transferred to the software 505. The time-stamped data can be sorted using the time-stamps, which makes it easy for an engineer to view the results in time-order and diagnose any problems. In addition to the data and the time-stamp, in some cases metadata may also be stored with the entry containing additional details regarding the event. For example, if the capture module stores information pertaining to state change events, then metadata regarding the type of state change event may be saved with each entry in the memory module 530.

In one embodiment, each capture module communicates the information collected to the tester software 505 using transfer interface 540. Typically, each capture module will comprise a transfer interface block to communicate the captured data to the software 505. The transfer interface block 540 can access the capture memory 530 using address and data lines, 572 and 573, respectively. The status signal (s) 574 provides information to the transfer interface regarding the location in memory 530 where the information is stored and any further information regarding the format of the data. The control signal(s) 575 allow the transfer interface block 540 to control the data flow to the software 505 and set any other preferences regarding controlling the data flow to the software 505.

In one embodiment, where a capture module is merely capturing status information, instead of a capture memory 530, the buffer would typically only comprise registers for storing the status information.

In one embodiment, the capture module can be programmed to determine time lags between events. For example, the capture module may be a Completion Capture module that logs the latency between a read request and the completion of the read request. Accordingly, one of the signals being monitored (e.g., using monitor 1 555A) will be a read request while another signal being monitored (e.g., using monitor N 555N) by the capture module will be a completion packet sent in response to completing the read request. The capture module can use time-stamps to monitor the time lag between the read-request and the completion or determine if there was no completion at all. The acquisition logic 520 of the capture module will typically need to be programmed with information from the specification, e.g., the PCIe specification regarding typical read request times and the maximum time beyond which a read-request failure needs to be flagged. The capture module can record information regarding the read-request times or any failure information in the capture memory 530 and report it out to the user through software 505.

In one embodiment, the user has control over how many and what type of capture modules should be programmed into a particular FPGA. Because FPGAs can easily be reprogrammed, a user is not necessarily limited to a fixed configuration. For example, a user may choose a different number and type of capture module based on the type of protocol being emulated on the FPGA or based on the type of design within which the FPGA is being used. The number and type of capture modules to be added to any particular FPGA can be specified at a command line interface when the designer is building the bit-files to be programmed into the FPGA. In other words, certain build options when programming the FPGA allows the user to easily select the number and type of capture modules to include in a design.

Figure 6:
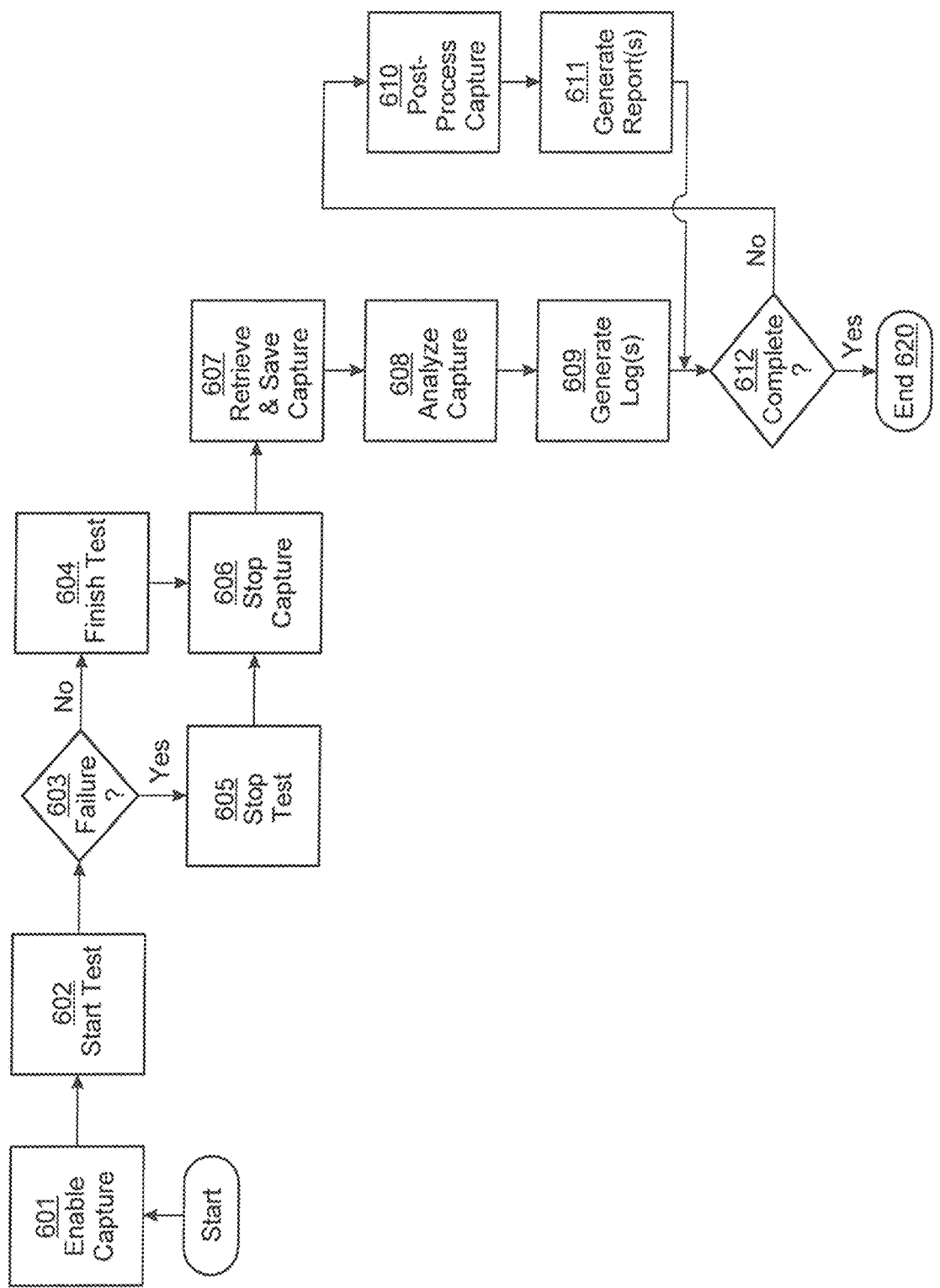
FIG. 6 illustrates a flowchart of an exemplary computer implemented process for capturing critical information during the course of automated device testing in order to determine root causes for device failure in accordance with one embodiment of the present invention.

FIG. 6 illustrates a flowchart of an exemplary computer implemented process for capturing critical information during the course of automated device testing in order to determine root causes for device failure in accordance with one embodiment of the present invention.

At step 601, capture is enabled for a particular test. This typically involves setting up the traffic capture including setting up the various configurations to enable and start the test. For example, the user would have to program the FPGA and determine the type and number of capture modules to include within the FPGA.

At step 602, the test is started. At step 603, if a failure is detected, the test is stopped at step 605. Subsequently, the capturing is stopped at step 606. If no failure is detected, the test is allowed to run its course until it finishes at step 604. Subsequently, the capturing is stopped at step 606.

Thereafter, the captured results are retrieved and saved at step 607 using the tester software. For example, the captured results may be saved and downloaded into software 505.

Once the data is gathered, at step 608, it can be analyzed either manually or automatically, e.g., using a rule-checker.

At step 609, logs are generated related to the test. At step 612, if there is no more data to process and the test is complete, the test ends at step 620. If, however, there is more data to process, a post-process analysis is run on the data at step 610. In one embodiment, the post-process analysis typically involves analyzing the logs to determine the root cause of device failure as explained in related U.S. patent application Ser. No. 15/916,126, filed Mar. 8, 2018, entitled "A LOG POST PROCESSOR FOR IDENTIFYING ROOT CAUSES OF DEVICE FAILURE DURING AUTOMATED TESTING." However, there may be other types of post-processing performed on the data as well. For example, the data along with the additional metadata with timestamps stored in the capture module memory 530 may not be in a format easily discernible by the user. The post-processing at step 609 converts the information retrieved from the capture modules into a format that a user can intuitively understand and use.

At step 611, a report is generated regarding the test. For example, the report may identify the root cause of a device failure or alert the user regarding any devices that may imminently fail.

Figure 7:
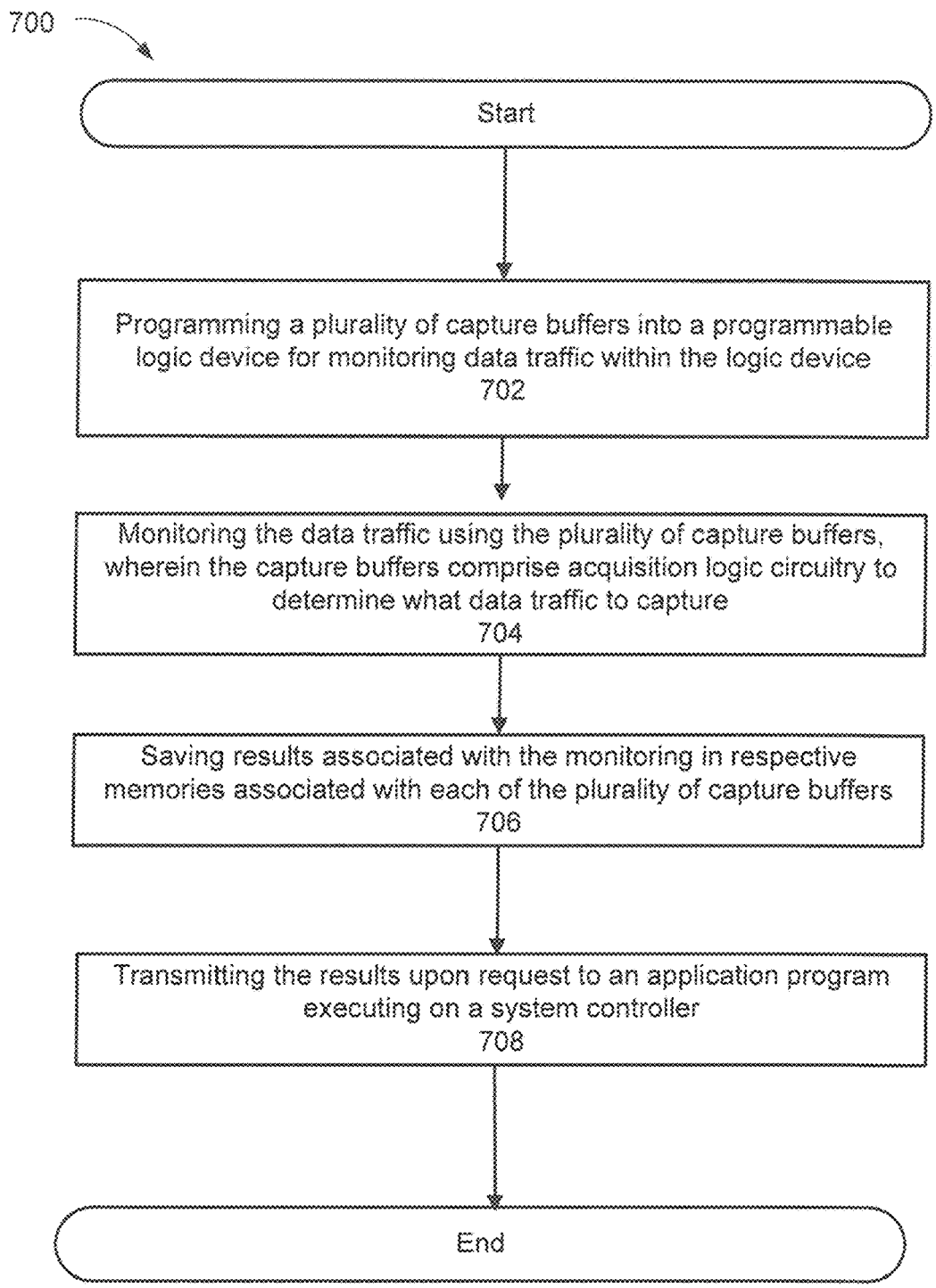
FIG. 7 illustrates a flowchart of an exemplary computer implemented process for using capture modules during automated device testing for monitoring data traffic and diagnosing problems in accordance with one embodiment of the present invention.

FIG. 7 illustrates a flowchart of an exemplary computer implemented process for using capture modules during automated device testing for monitoring data traffic and diagnosing problems in accordance with one embodiment of the present invention.

At step 702, a plurality of capture modules is programmed into a programmable logic device, e.g., an FPGA to monitor data traffic associated with a test on the FPGA. The FPGA, e.g., FPGA 495 is connected to a plurality of DUTs, e.g., DUTS 496A-496N to be tested. Further, the FPGA is also connected to a system controller, e.g., system controller 301 that executes the tester software application program for coordinating the tests. As mentioned above, the user can select the type and number of capture modules to program into the logic device prior to downloading the bit-file for programming the FPGA.

At step 704, the data traffic in the FPGA is monitored using the capture modules. The capture modules comprise acquisition logic circuitry 520 that determines the relevant data to capture and monitor.

At step 706, the results associated with the monitoring are saved in respective memories within each of the plurality of capture modules.

Finally, at step 708, the results are transmitted to the tester software application program executing on the system controller.

Graphical User Interface for Traffic Capture and Debugging Tool

As noted above, debug tools available in the testing industry allow for interpretation of collected data. The tools are mostly software-based and are geared towards organizing collected data in a context relevant manner, which allows the expert to more easily identify issues. However, these approaches are still fairly labor intensive because they require an engineer to manually review testing logs and files.

Embodiments of the present invention capture traffic and error information within FPGA logic (e.g., using capture modules 450A-450N, etc.) and couple the information with software (e.g., the software 505) to collect, process, and display data. Further, embodiments of the present invention advantageously provide a high amount of integration of various functions into the software. The software not only collects and aggregates data from the FPGA capture modules but also from various points in the tester system. Further, a user is able to configure the software to determine which capture modules to collect information from and the manner in which to analyze information from the capture modules.

Among other features, the software advantageously comprises a GUI that processes the data to display the data in an understandable manner. Further, the software: a) analyzes the data to detect suspect conditions that need further attention; b) allows the user to add/delete/modify/save suspect conditions; c) highlights data that has been flagged with said suspect conditions; d) provides links between the source data and flagged conditions.

Also, embodiments of the present invention not only advantageously add analysis capability within the capture logic modules in the firmware, but also provide software 505 able to analyze the information transmitted from the capture logic modules. The software 505 comprises a graphical user interface (GUI) that displays the information from the capture modules to the user after a post-processing step performed by software 505. It is appreciated that the automated software-based debugging tools included within software 505 can extract the capture results from the capture modules, e.g., 450A-450N, 451A-451M, etc., organize the data, and display the root cause of the problem.

In one embodiment, once the captured results are retrieved from the capture modules and saved using the tester software 505, the data can be analyzed automatically (e.g., using a rule-checker) after being post-processed using tester software 505. In one embodiment, the post-processing analysis typically involves analyzing the logs to determine the root cause of device failure as explained in related U.S. patent application Ser. No. 15/916,126, filed Mar. 8, 2018, entitled "A LOG POST PROCESSOR FOR IDENTIFYING ROOT CAUSES OF DEVICE FAILURE DURING AUTOMATED TESTING." However, there may be other types of post-processing performed on the data as well. For example, the data along with the additional metadata with timestamps stored in the capture module memory 530 may not be in a format easily discernible by the user. The post-processing at step 609 converts the information retrieved from the capture modules into a format that a user can intuitively understand and use. Further, the information may be displayed to a user through the GUI associated with the software 505.

Some of the errors identified within software 505 based on the data collected from the capture modules may follow a particular or unique pattern. Such patterns may be referred to as 'error signatures.' In one implementation, software 505 is configured to automatically recognize the error signatures and take a predetermined action (e.g., generate an alert, message the user, store information in a log, etc.) associated with a respective error signature. Rules determining the action to be taken in response to a particular signature may be programmed into software 505. Further, the action to be taken in response to a particular signature may include displaying an error message or an alert to the user through the GUI. The 'error signatures' are described in further detail below.

In one embodiment, after analyzing the results, the software 505 generates a report regarding the test. For example, the report may identify the root cause of a device failure or alert the user regarding any devices that may imminently fail.

In one embodiment, the GUI associated with software 505 advantageously provides an intuitive data display for a user performing trouble-shooting when scanning and analyzing the data captured by a traffic capture tool (e.g., capture tool 450A, etc.). After the capture option is selected using the GUI of software 505, data is captured and received at software 505 from the FPGA 495 of FIG. 4.

In one embodiment, data from capture log files is displayed in a more intuitive and graphical manner to a technician so that issues can be more readily identified on the GUI display. In one implementation, data from the log files is read, in addition to the specification (e.g., ranges or limits dictated by a standard), and the software 505 renders images and other visual attributes for display which assist in determining the meaning of the captured data in a more intuitive manner (as compared to reading the log files directly). In this manner, the data read from the log files, in combination with the specification, is presented in the GUI in such a way as to facilitate a technician in determining an error or issue in the operation of the system.

The GUI displays provided by embodiments of the present invention are advantageous because they make error determining easier, faster, and less cumbersome as compared to reading the data directly which is time consuming and error prone. Further, the GUI allows technicians to be trained faster on identifying the types of errors that are associated with a specification.

Figure 8:
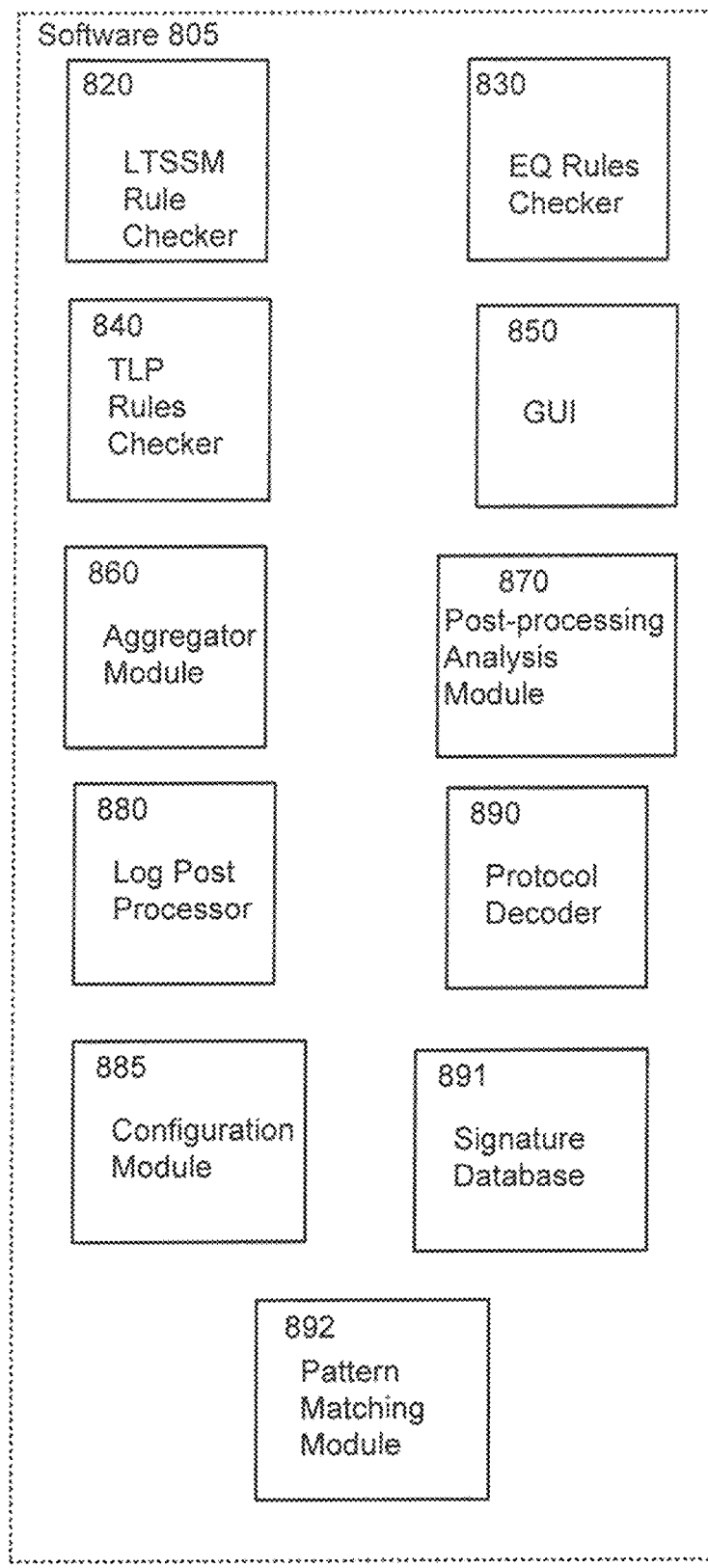
FIG. 8 is a block diagram illustrating the various functional components of the software system in accordance with one embodiment of the present invention.

FIG. 8 is a block diagram illustrating the various memory-resident functional components or modules of the software system in accordance with one embodiment of the present invention. In one embodiment, the software 805 comprises a GUI 850 that displays the test data to a user in an understandable manner as discussed above. The GUI also enables the user to program and configure the capture modules to collect the requisite information. Further, the GUI allows a user to program rules into the software to be able to automate the analysis of the information captured by the capture modules. In one embodiment, the software may also comprise a configuration module that allows the user to configure the various capture modules in the tester system and the way information received from each of the capture modules is analyzed by the software 805 (e.g., analysis module 870).

In one embodiment, the software 805 comprises a log post processor module 880 for analyzing logs from the DUTs (e.g. 496A from FIG. 4) or capture modules (e.g., 450A from FIG. 4) to determine the root cause of device failure as explained in related U.S. patent application Ser. No. 15/916, 126, filed Mar. 8, 2018, entitled "A LOG POST PROCESSOR FOR IDENTIFYING ROOT CAUSES OF DEVICE FAILURE DURING AUTOMATED TESTING." The software 805 will automatically execute the log post processor, analyze the logs and provide information regarding the failing DUT or the root cause of failure in the tester system.

The software 805 may also, for example, comprise an aggregator module 860 configured to collect and aggregate data from the FPGA capture modules and also from various points in the tester system, as noted above. The software 505 may also, for example, comprise a post-processing analysis module 870 that conducts post-processing analysis on the data retrieved from the capture modules to detect suspect conditions that need further attention. The analysis module also allows a user to add, delete, modify, or flag a suspect condition. In other words, the user is able to configure an alert related to a condition that is user-defined. Accordingly, the user is able to manually set some rules that identify suspect conditions and failures.

In one implementation, the post-processing analysis module 870 may also recognize error signatures and take a predetermined action in response to recognizing a particular error signature in the data retrieved from the capture modules. In one embodiment, the software 805 allows a user to add comments associated with a particular failure condition that may be used at a later date.

Note that all the modules shown in FIG. 8 are fully customizable by the user. In other words, the user can configure the modules and automate them to perform the type of collection and analysis that is particular to the user. Further, the modules can be configured to report the type of issues and failures, including the times associated with the issues and failures (using the timestamps discussed in connection with FIG. 5) and the causes of the failures, as configured by the user.

In one embodiment, the software 805 may be configured to comprise multiple types of analysis modules, e.g., rule checking modules. Each rule checking module may be associated with a particular type of capture module. For example, software 505 may implement a different rule checker or analysis module for a LTSSM capture module, an Activity Capture module, an Equalization capture module, an Advance Error Reporting capture module, a TLP Rules capture module, etc. FIG. 8 displays an LTSSM rule checker module 820, an EQ rules checker module 830 and a TLP rules checker module 840. However, it should be noted that the software 805 may comprise as many respective modules as there are types of capture modules in the tester system.

The analysis modules (e.g. rule-checking modules) provide default rules and also allow user to modify (or add rules) to look for potential failures in the logs. The user can also save the results and link the output to a protocol decoder 890 to locate the suspected packet(s). For each type of analysis module, the GUI 850 of software 805 will display a separate interface comprising windows that: (1) display the desired condition to detect; (2) display the conditions that have been detected; and (3) the point in the capture data where the detected conditions occur.

As noted above, in one embodiment, there may be several different types of capture logic modules programmed into the FPGA, wherein each capture module is programmed to serve a different purpose. In one implementation, each type of capture module has a corresponding analysis module within the software 805 of FIG. 8.

As discussed previously, a capture module may be programmed as a Link Training Status State Machine (LTSSM) Capture module. The LTSSM capture module comprises logic circuitry that logs LTSSM events. The LTSSM defines the states machine that the physical and link layer states in the PCIe protocol go through in order to communicate from one end point to another. These states can be captured and analyzed using capture module logic within an FPGA. For example, the capture module may be able to identify and capture the different states the IP core of the FPGA is transitioning through in the execution of the PCIe protocol. If there is a failure in transitioning to an expected state or if a failure occurs while processing a particular state, the capture module will capture the information and transmit it to software 805 for further analysis. Alternatively, in one embodiment, the capture module may contain further logic circuitry to analyze the error condition, e.g., using a rule-checker and determine the root cause of error. The diagnostic information can then be transmitted to the software 805 to relay to the user.

In another embodiment, a capture module can comprise an LTSSM Rules Checking module. This type of capture module in PCIe devices is programmed with FPGA logic to determine if the LTSSM state transitions are normal. The LTSSM Rules Checking capability can also be programmed into post-processing software (e.g., within software 805) in cases where it may be more efficient to perform rules-checking using software rather than hardware modules.

Figure 9:
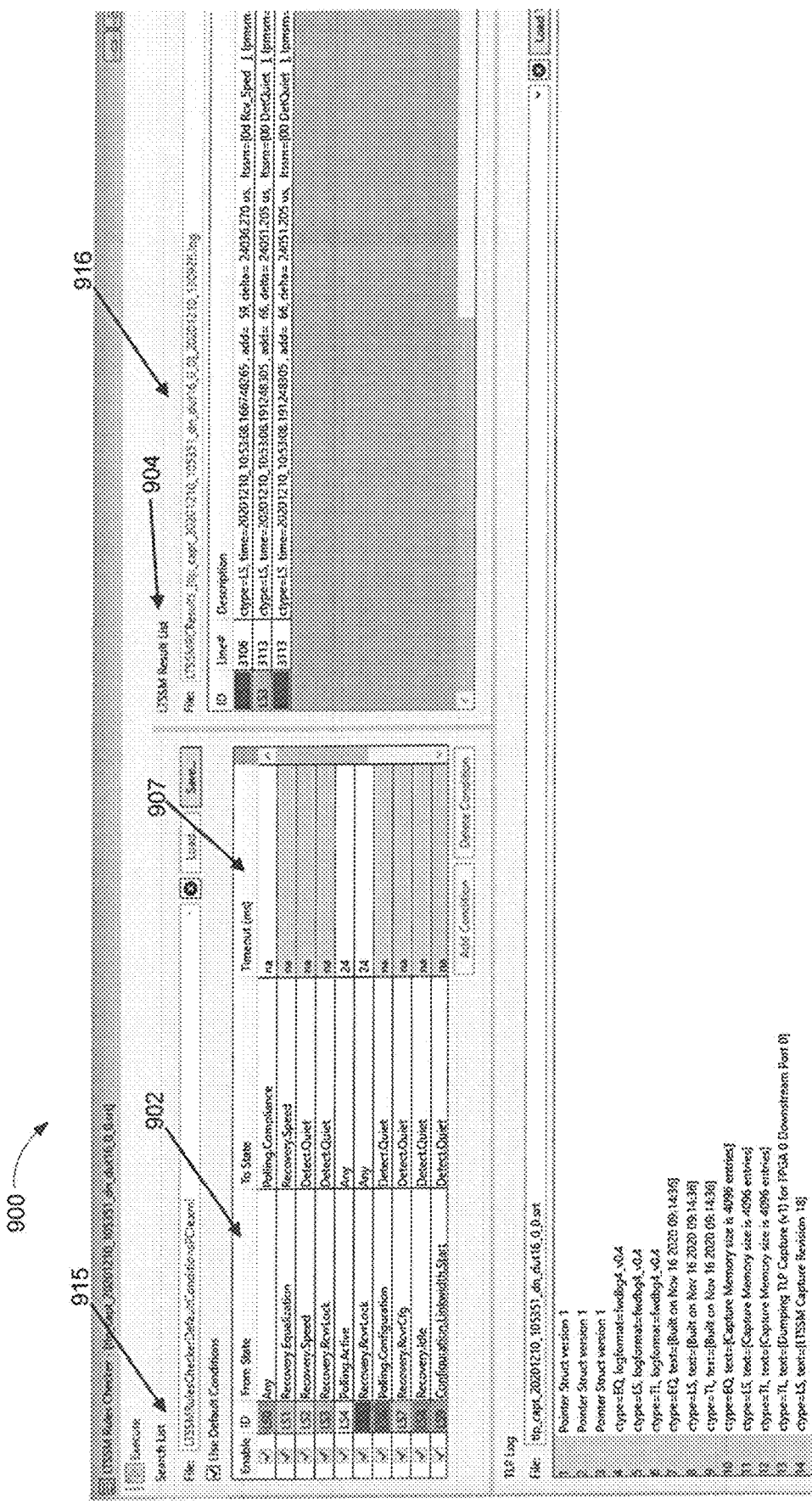
FIG. 9 illustrates an exemplary on-screen display of a GUI for configuring an LTSSM rule checker within the software system in accordance with one embodiment of the present invention.

FIG. 9 illustrates an exemplary on-screen display within GUI 900 for configuring an LTSSM rule checker within the software system in accordance with one embodiment of the present invention. In one embodiment, software 805 may be configured by a user to analyze an error condition related to an LTSSM capture or to determine if the LTSSM state transitions are normal. For example, in window 915 within GUI 900, a user may configure software 805 to detect certain state transitions (transitions from a "From State" 902 to a "To State" 904) and whether the transitions have crossed over a threshold timeout value 907. The software 805 may be configured to trigger on a timeout value 907 exceeding a predetermined threshold value. In a different window 916 within the GUI 900, software 805 may be configured to display a results list 904 comprising additional details regarding LTSSM state transitions that matched the conditions the user was looking for in window 915. Further, within GUI 900 another window may show the actual contents of the log file from which the results list 904 was extracted.

As discussed previously, in one embodiment, a capture module can comprise an Equalization Capture module. The Equalization Capture module logs equalization events. Equalization can be performed for the PCIe protocol by adjusting the signals on a transmitter and receiver so that the integrity of the data communicated can be maintained. The equalization process compensates for certain criteria (e.g., characteristics of the signal channel) to be able to recover a signal. For example, equalization helps in being able to recover digital data from an analog signal by making sure the integrity of the signal is maintained which is especially important in noisy environments. The capture module will monitor the PCIe IP core to determine the manner in which equalization is progressing. In other words, the capture module will monitor the IP core to determine which settings are being requested and used for purposes of equalization and whether they are being accepted. If there is suspicious activity or any illegal values being set, the activity can be captured and flagged and reporter to the user through software module 805.

Figure 10:
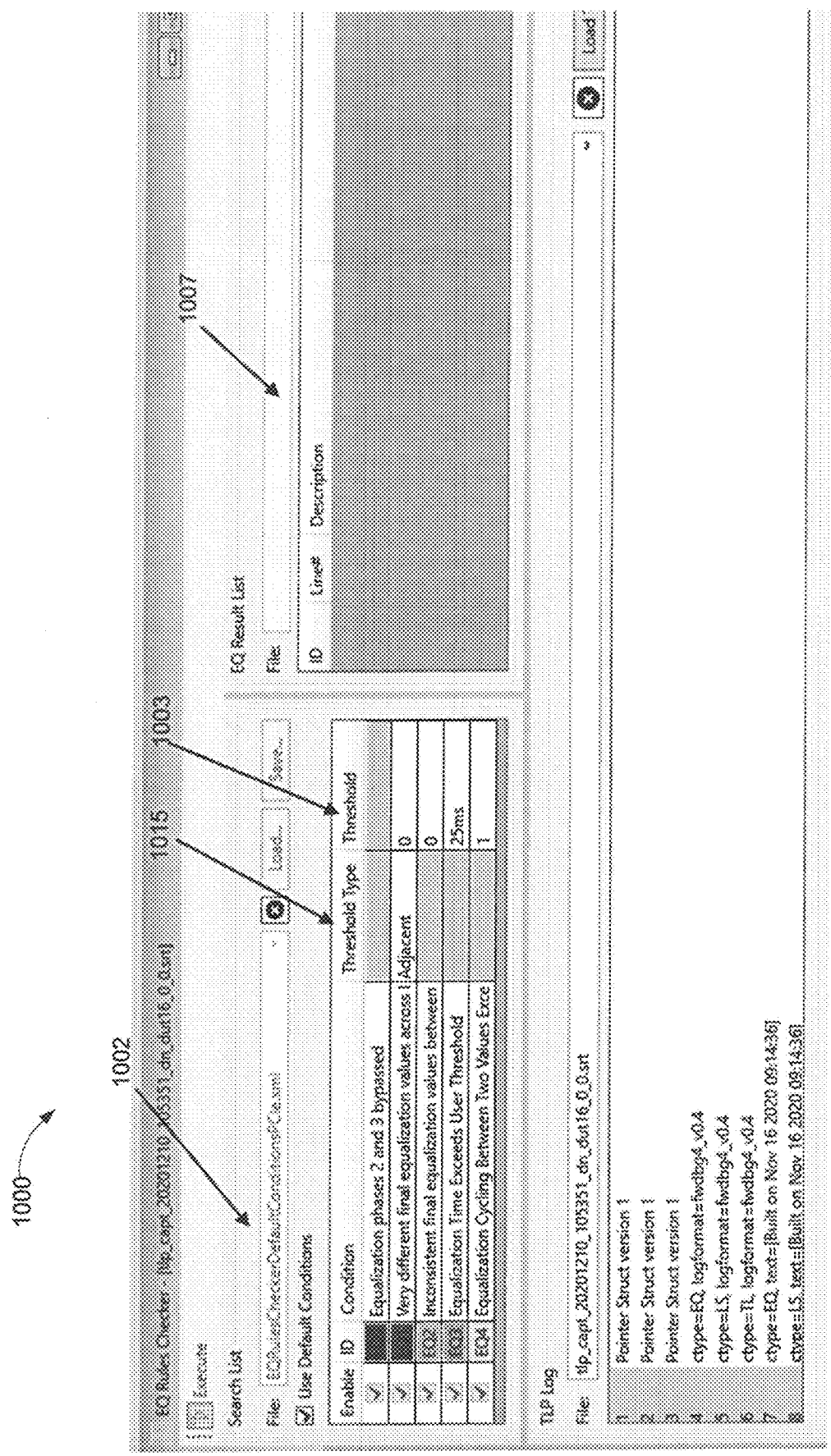
FIG. 10 illustrates an exemplary on-screen display of a GUI for configuring an Equalization rule checker within the software system in accordance with one embodiment of the present invention.

FIG. 10 illustrates an exemplary on-screen display within GUI 1000 for configuring an Equalization rule checker within the software system in accordance with one embodiment of the present invention. In one embodiment, software 805 may be configured by a user to analyze equalization information received from the capture modules. The user may be able to configure rules or processes that check for certain conditions within the equalization information. The window 1002 illustrates certain rules that can be configured by a user that trigger based on certain predetermined conditions. The user may be able to program a threshold type 1015 and a threshold value 1003 associated with each rule. The window 1007 in GUI 1000 indicates if any of the conditions configured (and shown in window 1002) were triggered.

As noted previously, if the DUTs are PCIe devices, one or more of the capture modules can comprise Transaction Layer Packet (TLP) capture modules. Transaction layer packets are exchanged between a host and a client (or between a tester and a device under test) using the PCIe protocol and the capture module in the FPGA may, for example, capture these TLPs for further inspection and to collect failure related information.

In one implementation, TLP packets can comprise three types of captures (or data from three different types of capture modules). For example, the TLP packets may comprise the data traffic (data exchanged between a host and client), the LTSSM traffic and the Equalization traffic all merged together in one file. Grabbing a single file with information about different types of capture modules is advantageously efficient.

Figure 11:
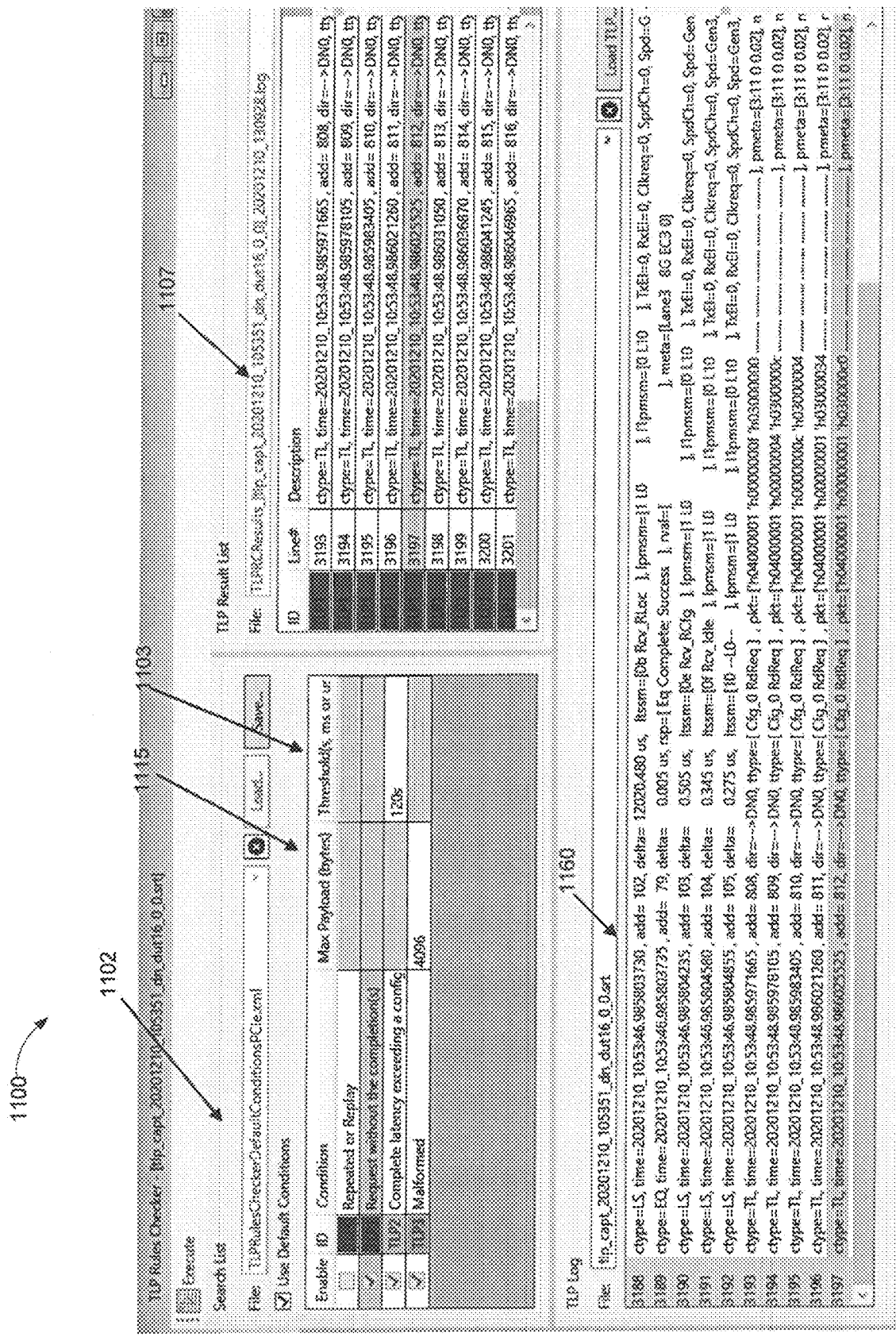
FIG. 11 illustrates an exemplary on-screen display of a GUI for configuring a TLP rule checker within the software system in accordance with one embodiment of the present invention.

FIG. 11 illustrates an exemplary on-screen display within GUI 1100 for configuring a TLP rule checker within the software system in accordance with one embodiment of the present invention. In one embodiment, software 805 may be configured by a user to analyze the transaction layer information received from the capture modules. The user may be able to configure rules or processes that check for certain conditions within the equalization information. The window 1102 illustrates certain rules that can be configured by a user that trigger based on certain predetermined conditions. The user may be able to program a maximum payload threshold 1115 and a time threshold value 1103 associated with each rule. The window 1107 in GUI 1100 indicates if any of the conditions configured (and shown in window 1102) were triggered. In one implementation a TLP log file may be shown in a separate window 1160. The software 805 may be configured to automatically highlight rows associated with error conditions in the log file display window 1160.

Figure 12:
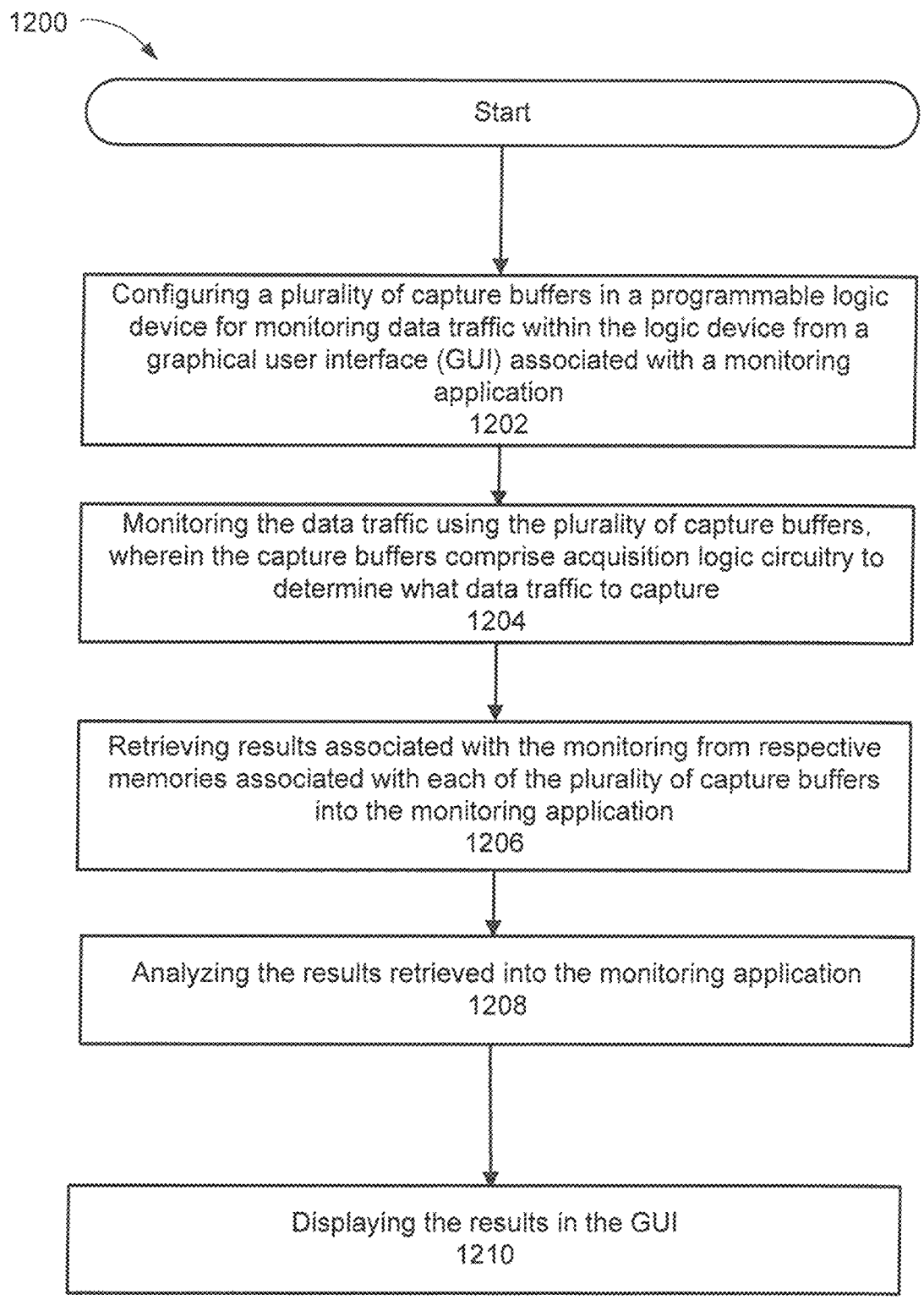
FIG. 12 illustrates a flowchart of an exemplary computer implemented process for analyzing information retrieved from capture modules in a programmable logic device during automated device testing in accordance with one embodiment of the present invention.

FIG. 12 illustrates a flowchart 1200 of an exemplary computer implemented process for analyzing information retrieved from capture modules in a programmable logic device during automated device testing in accordance with one embodiment of the present invention.

At step 1202, a plurality of capture modules is programmed into a programmable logic device, e.g., an FPGA to monitor data traffic associated with a test on the FPGA. The FPGA, e.g., FPGA 495 is connected to a plurality of DUTs, e.g., DUTS 496A-496N to be tested. Further, the FPGA is also connected to a system controller, e.g., system controller 301 that executes the tester software application program for coordinating the tests. As mentioned above, the user can select the type and number of capture modules to program into the logic device prior to downloading the bit-file for programming the FPGA. In one embodiment, the capture modules may be programmed and configured through a GUI of a software system for a monitoring application connected to the FPGA, e.g., software 805.

At step 1204, the data traffic in or passing through the FPGA is monitored using the capture modules. The capture modules comprise acquisition logic circuitry 520 that determines the relevant data to capture and monitor.

At step 1206, the results associated with the monitoring are retrieved from respective memories within each of the plurality of capture modules into the monitoring application.

Finally, at step 1208, an analysis is performed on the results and, at step 1210, the results are displayed through the GUI associated with the monitoring application.

Diagnostic Tool for Traffic Capture with Known Signature Database

As noted above, embodiments of the present invention capture traffic and error information within FPGA logic (e.g., using capture modules 450A-450N, etc.) and couple the information with software (e.g., the software 805 of FIG. 8) to collect, process, and display data. Further, embodiments of the present invention advantageously provide a high amount of integration of various functions into the software 805. The software 805 not only collects and aggregates data from the FPGA capture modules but also from various points in the tester system.

Also, embodiments of the present invention not only advantageously add analysis capability within the capture logic modules in the firmware, but also provide software 805 able to analyze the information transmitted from the capture logic modules. The software 805 comprises a graphical user interface (GUI) that displays the information from the capture modules to the user after a post-processing step performed by software 805. It is appreciated that the automated software-based debugging tools included within software 805 can extract the capture results from the capture modules, e.g., 450A-450N, 451A-451M, etc., organize the data, and display the root cause of the problem.

Some of the errors identified within software 805 based on the data collected from the capture modules may follow a particular or unique pattern. Such patterns may be referred to as "error signatures." As explained above, conventional tools of debugging hardware systems did not have a way to automatically identify error patterns that are repeatable. For example, if an error pattern identified in a DUT correlated with a known prior error signature, there was no way to correlate the error pattern with the known signature previously identified. This caused inefficiencies because each error needed to be debugged afresh instead of using prior knowledge accumulated regarding the causes of the respective error and ways in which to correct for it.

Embodiments of the present invention use a database of known signatures 891 (shown in FIG. 8) to locate a particular known signature. Further, embodiments of the present invention use a pattern matching module 892 (also shown in FIG. 8) to determine if a known signature in database 891 is similar to a newly captured and presented data pattern (that may indicate an error) to help identify the cause associated with the newly captured and presented error pattern. More than one database signature can be presented in the suggestion list and ranked by order of priority or closest match by the pattern matching module 892. In this way, a technician can present a newly discovered error pattern to the software or debugging tool, which will scan the database to determine a suggestion related to the cause of the issue which generated the newly presented error pattern.

In one implementation, software 805 is configured to automatically recognize the error signatures and take a predetermined action (e.g., generate an alert, message the user, store information in a log, etc.) associated with a respective error signature. Rules determining the action to be taken in response to a particular signature may be programmed into software 805. Further, the action to be taken in response to a particular signature may include displaying an error message or an alert to the user through the GUI.

Referring to FIG. 8, embodiments of the present invention create and maintain a signature database 891 of known error signatures and/or signatures associated with known issues that have already been identified and obtained from traffic capture and debug tools (e.g., using capture modules 450A-450N, discussed in connection with FIG. 4). In addition to the signature, the database also stores the cause of the signature. The error signatures (and signatures associated with known issues) can initially be captured through any mechanism, including manual identification, via automatic data capture (from the hardware-based capture modules) and/or from software 805 described above. The known signatures (and cause descriptions) are then placed into the database (e.g., database 891) that can be scanned automatically with respect to an unknown signature for identification of a cause thereof (e.g., by pattern matching module 892).

Figures 13, 14:
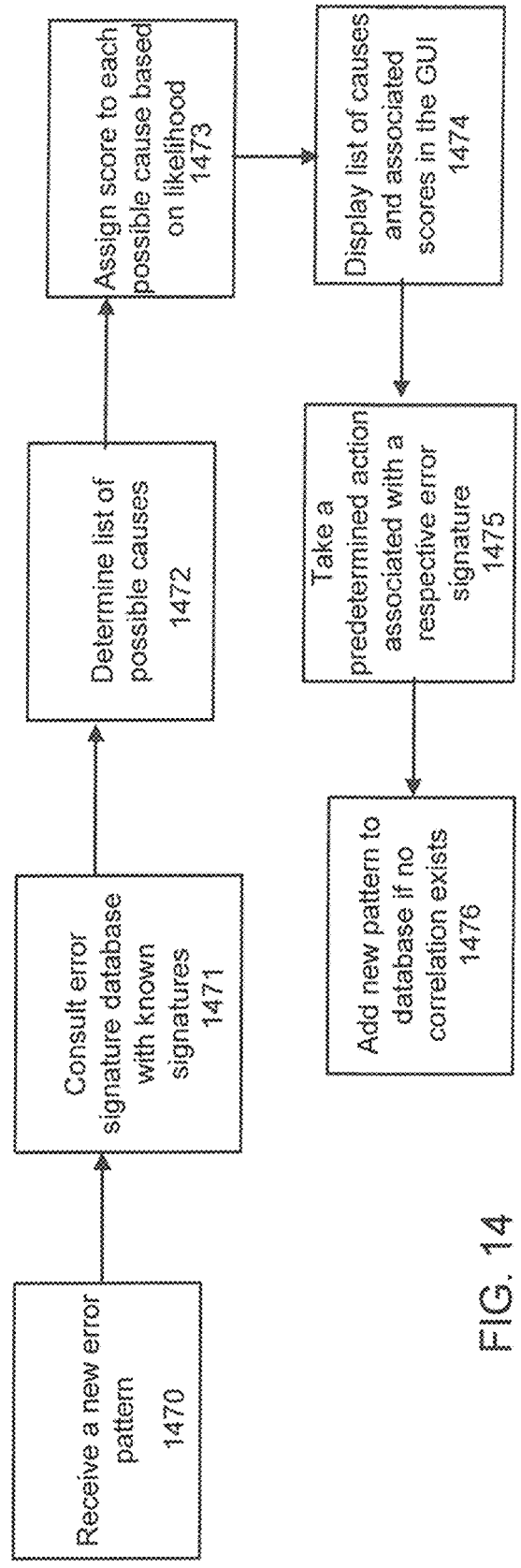
FIG. 13 is a block diagram illustrating an exemplary format for storing error signatures in the memory resident signature database in accordance with one embodiment of the present invention.
FIG. 14 illustrates an exemplary flow diagram illustrating the manner in which the known signature database may be used to correlate an incoming error pattern from one or more hardware-based capture modules with a known signature in accordance with one embodiment of the present invention.

FIG. 13 is a block diagram illustrating an exemplary format for storing error signatures in the memory resident signature database in accordance with one embodiment of the present invention. As noted in connection with FIG. 8, embodiments of the present invention create and maintain a known signature database 891 of known error signatures and/or signatures associated with known issues. Each entry in the database 891 may be stored with associated metadata. For example, each entry may comprise the error signature 1310 itself. As noted above, the error signature 1310 may, for example, comprise a set of bits that are indicative of an error pattern that may be repeatable. Alternatively, the error signature 1310 may be identified with a unique label.

In one embodiment, the database entry may also provide information regarding a type of capture module 1320 associated with the error signature. For example, the error signature may be particular to a type of capture module, e.g., LTSSM, TLP, a NAK capture module, an Equalization capture module, etc.

In one embodiment, the database entry may also provide information regarding a method of identification 1330. For example, the data entry may specify whether the particular error signature was identified through manual identification, via automatic data capture (using information from the hardware-based capture modules themselves) or identified by software 805, e.g., by post-processing analysis module 870 in FIG. 8.

In one embodiment, the database entry may also provide information regarding an identified cause 1340 for respective error signature. As noted above, a known error signature in the database 891 may be identified either manually (e.g., through the GUI of the software 805), by the hardware-based capture modules or by the software 805. The known error signature may be correlated with its cause by pattern matching module 892 and information regarding the cause 1340 of the error may be saved along with the known error signature in the database 891.

Also, in one embodiment, a suggested action 1350 to be taken in response to encountering a particular type of error may be saved with the corresponding error signature. As noted above, software 805 is configured to automatically recognize the error signatures and take a predetermined action (e.g., generate an alert, message the user, store information in a log, etc.) associated with a respective error signature. Rules determining the action to be taken in response to a particular signature may be programmed into software 805, e.g., as part of post-processing analysis module 870.

FIG. 14 illustrates an exemplary flow diagram illustrating the manner in which the known signature database may be used to correlate an incoming error pattern from one or more hardware-based capture modules with a known signature in accordance with one embodiment of the present invention.

At block 1470, a new data pattern (e.g., a pattern that is indicative of an error) is received into a software system for a monitoring application connected to the FPGA, e.g., software 805, from, for example, the hardware-based capture modules discussed in connection with FIG. 4.

At block 1471, the error pattern is compared by pattern matching module 892 of FIG. 8 with known signatures in the known signature database 891. In one embodiment, the software 805 is able to collect metrics and test data from the hardware-based capture modules. Further, using the known failure history and associated error signatures for each capture module, the software 805 is able to correlate an incoming error pattern with known signatures in database 891.

At block 1472, based on the comparison with the known signature database, the error pattern is correlated with one or more possible error signatures and respective causes. Note that some patterns may be ambiguous and may have multiple potential matching signatures with which they may be correlated. In one embodiment, a pattern matching algorithm may be used to determine a correlation between an error pattern and a known error signature in a database. In a different embodiment, machine learning methods may be employed to determine a correlation. In other embodiments, one of several different algorithms may be used to determine the correlation.

At block 1473, a score is assigned to each of the possible known error signatures and associated causes based on the degree of correlation that the incoming error pattern has to the known signature. For example, if the incoming error pattern has a high correlation to a particular known error signature in the signature database 891, it will be assigned a higher score. In one embodiment, machine learning tools can be employed to correlate the incoming error pattern with various possible known signatures and assign scores to each of the possible causes.

At block 1474, the incoming error pattern is displayed with the list of possible causes and associated scores in GUI 850 (discussed in connection with FIG. 8). In one implementation, the post-processing analysis module 870 allows a user to add comments associated with a particular failure condition and store it as metadata along with the new error pattern for use at a later date.

In one embodiment, however, no graphical display is required, and the input signature is automatically compared by software against the database of known signatures for automatically generating a suggestion as to the cause of the issue.

At block 1475, software 805 is configured to automatically take a predetermined action (e.g., generate an alert, message the user, store information in a log, etc.) associated with a respective error signature. Rules determining the action to be taken in response to a particular signature may be programmed into software 805 and metadata associated with the rule may be stored as part of the error signature in field 1350 as discussed in connection with FIG. 13. For example, if the incoming error pattern received at block 1470 has a high correlation with a given known signature, software 805 (in particular, e.g., post-processing analysis module 870) may be configured to automatically execute the rule associated with a suggested action (e.g., suggested action 1450 stored in field 1350 of FIG. 13) taken in response to the error signature.

At block 1476, if the incoming error pattern does not correlate with a known error signature, the post-processing analysis module 870 of FIG. 8 analyzes it to determine if it should be added to database 891 as a "known signature." In one embodiment, machine learning methods may also be employed to determine if a particular error pattern needs to be added to the known signature database 891.

Embodiments of the present invention are advantageous because they make error identification easier and less cumbersome as compared to reading and analyzing an incoming error pattern manually which is time consuming and error prone. Further, embodiments of the present invention allow technicians to be trained faster on identifying the types of errors that are associated with a system. Prior systems do not comprise an option to check data patterns against prior error signatures that have been identified and collected.

Figure 15:
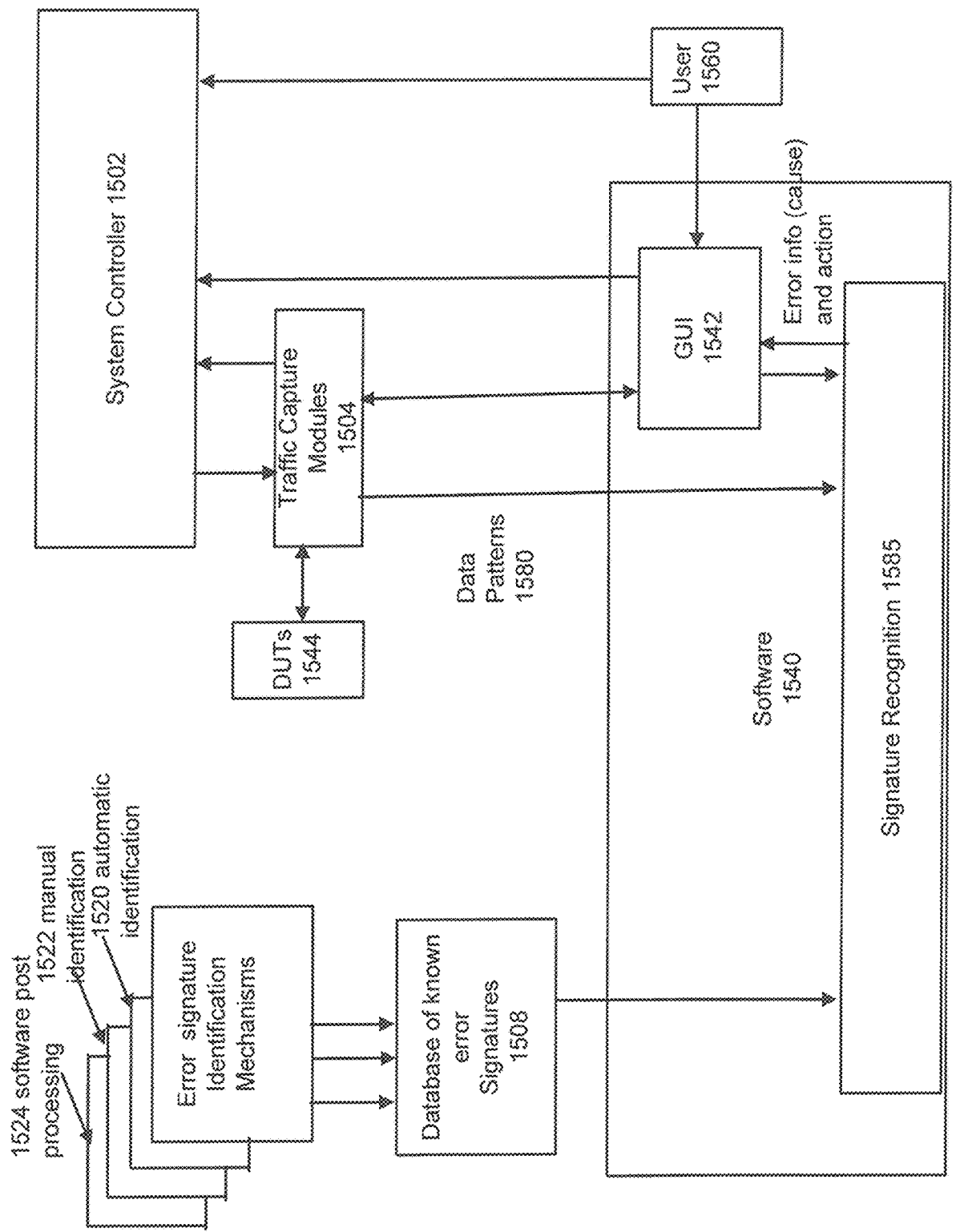
FIG. 15 illustrates an exemplary dataflow diagram illustrating the manner in which the known signature database may be used for identifying error patterns from one or more hardware-based capture modules in a hardware test system in accordance with one embodiment of the present invention.

FIG. 15 illustrates an exemplary dataflow diagram illustrating the manner in which the known signature database may be used for identifying error patterns from one or more hardware-based capture modules in a hardware test system in accordance with one embodiment of the present invention.

In one embodiment, software 1540 (which performs substantially the same function as, for example, software 805 in FIG. 8) accesses prior known error signatures from a database of known error signatures 1508. As noted above, the database 1508 may be programmed using a manual identification module 1522, via an automatic data capture module 1520 (using information from the hardware-based capture modules themselves) or identified by a software module 1524 (which are all different forms of error signature identification modules). Note that each of the modules 1524, 1522 and 1520 and the database of known error signatures 1508, in one embodiment, may be integrated into the software 1540.

The system controller 1502 may perform substantially the same functions as the system controller 301 in FIG. 3. A user 1560 may configure the hardware traffic capture modules 1504 (e.g., 450A-450N, 451A-451M, etc. in FIG. 4) from the system controller 1502. In one embodiment, as discussed above, the traffic capture modules 1504 may capture test data including potential error patterns from the DUTs 1544. Also, the traffic capture modules 1504 may write data to the DUTs 1544 as discussed previously. Note that, in one embodiment, the software 1540 may also reside within the system controller 1502 and the hardware-based traffic capture modules 1504 may be configured using the GUI 1542 residing in the software 1540.

In one embodiment, the data patterns 1580 that may potentially contain an error pattern are captured from the traffic capture modules 1504 and recognized using pattern matching module 1585 (which substantially performs the same function as module 892 in FIG. 8). If a matching patterns exists in the database of known signatures 1508, the error information is displayed through the GUI 1542. In one embodiment, a prescriptive action to take in response to the error may either be displayed to a user or executed automatically by software 1540.

Figure 16:
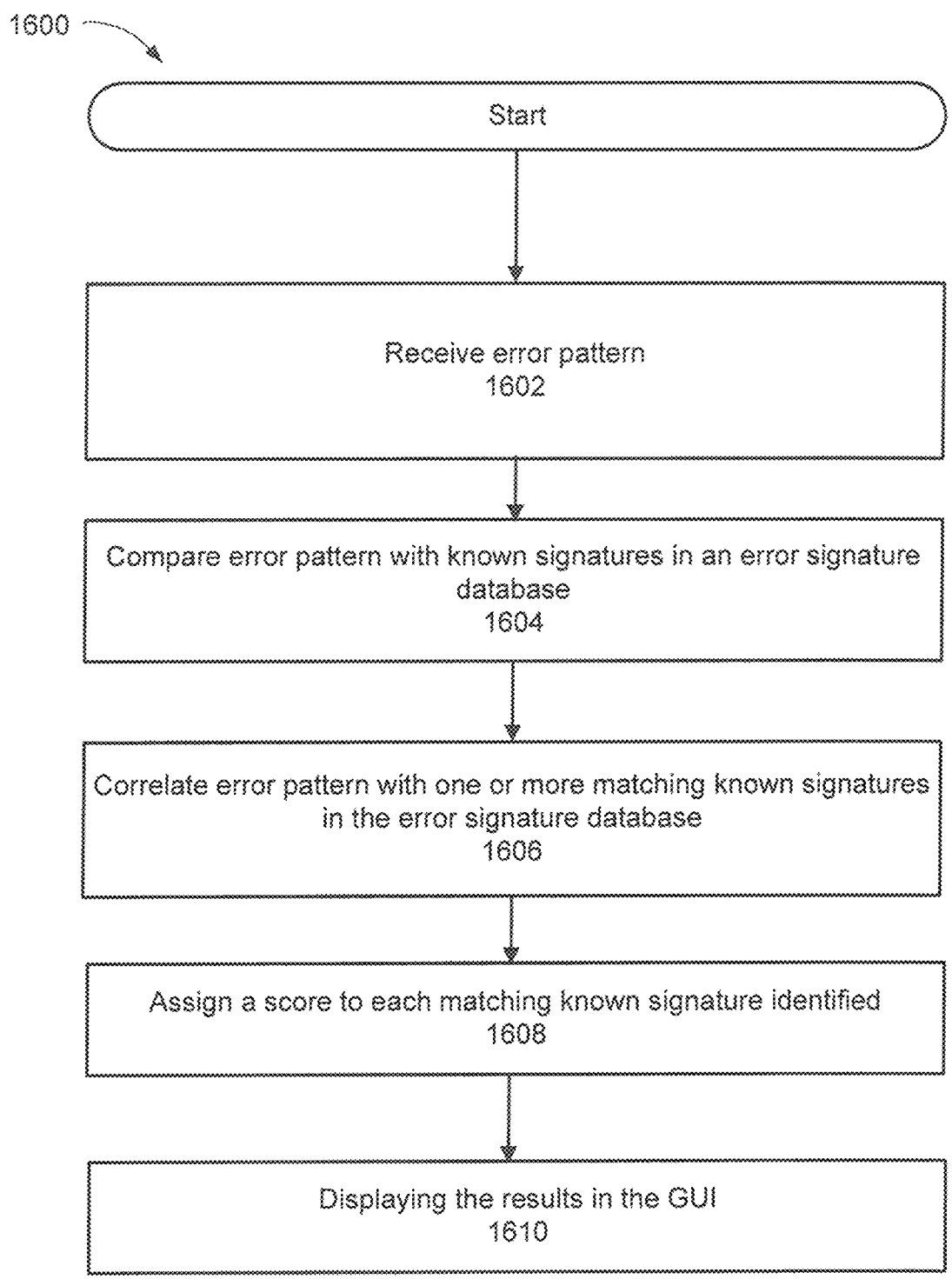
FIG. 16 illustrates a flowchart of an exemplary computer implemented process for identifying error patterns using a known error signature database during automated device testing in accordance with one embodiment of the present invention.

FIG. 16 illustrates a flowchart 1600 of an exemplary computer implemented process for identifying error patterns using a known error signature database during automated device testing in accordance with one embodiment of the present invention.

At block 1602, a new data pattern is received into a software system for a monitoring application connected to the FPGA, e.g., software 805, from, for example, the hardware-based capture modules discussed in connection with FIG. 4. The data pattern may be resultant from an error of the automated device testing.

At block 1604, the data pattern is compared with known error signatures in the known error signature database 891 as discussed in connection with FIG. 14.

At block 1606, based on the comparison with the known signature database, the data pattern is correlated with one or more possible error signatures and respective causes. Note that some patterns may be ambiguous and may have multiple potential matching signatures with which they may be correlated.

At block 1608, a score is assigned to each of the possible known error signatures and associated causes based on the degree of correlation that the incoming error pattern has to the known signature.

At block 1610, the incoming data pattern is displayed with the list of possible causes and associated scores in GUI 850 (discussed in connection with FIG. 8).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of identifying error patterns during automated device testing, the method comprising:
receiving a data pattern from a plurality of capture modules programmed on a programmable logic device, wherein the programmable logic device is operable to generate commands and data to test a plurality of devices under test (DUTs), wherein the plurality of capture modules are programmable and operable to selectively capture data traffic to be monitored, wherein the data traffic comprises a flow of traffic between the plurality of DUTs and the programmable logic device, wherein the plurality of capture modules each include acquisition logic and capture memory, wherein the programmable logic device includes a transfer interface coupled to the plurality of capture modules, and wherein each programmed capture module is operable to analyze the data pattern and identify an error condition, wherein analyzing and identifying comprises:
comparing the data pattern of the data traffic between a DUT and the programmable logic device captured by the plurality of capture modules with known signatures in a database, wherein the database further includes metadata that associates an error signature of each error with a type of capture module, a method of identification, a cause of error and a suggested action to take in response to the error;
correlating the data pattern with one or more matching known signatures stored in the database;
assigning a score to each of the one or more matching known signatures in the database based a level of correlation thereof; and
taking a predetermined action based on the score of the one or more matching known signatures and the associated action to take in response to the error associated with the one or more matching known signatures in the database.

2. The method of claim 1, wherein the plurality of capture modules in the programmable logic device are configured to capture and report information using input received from a graphical user interface (GUI) associated with a monitoring application.

3. The method of claim 1, wherein the plurality of capture modules are configured using a plurality of stages, and wherein the flow of traffic between the DUT and the programmable logic device is processed through the plurality of stages.

4. The method of claim 3, wherein each stage of the plurality of stages is configured to comprise one or more of the plurality of capture modules.

5. The method of claim 1, wherein the receiving comprises:
retrieving results associated with monitoring the data traffic from respective memories associated with each of the plurality of capture modules; and
extracting the data pattern from the results associated with the monitoring.

6. The method of claim 1, further comprising:
displaying the data pattern and the cause of error associated with each of the one or more matching known signatures in a graphical user interface (GUI).

7. The method of claim 1, further comprising:
displaying the data pattern, the cause of error associated with each of the one or more matching known signatures, and a respective score associated with each of the one or more matching known signatures in a graphical user interface (GUI).

8. The method of claim 1, further comprising:
storing the data pattern and associated metadata comprising user comments for future retrieval.

9. The method of claim 1, further comprising:
determining a match to the data pattern from the one or more matching known signatures; and
executing a rule associated with the match, wherein the rule comprises a suggested action to be taken in response to encountering an error associated with the match.

10. The method of claim 9, wherein the rule is selected from a group consisting of: generating an alert, messaging a user, and storing information in a log.

11. The method of claim 1, further comprising:
responsive to a determination that the data pattern does not correlate to any known signatures in the database, adding the data pattern as a new error signature in the database.

12. The method of claim 1, wherein the correlating comprises using machine learning methods to create a correlation between the data pattern and the one or more matching known signatures.

13. The method of claim 1, wherein the correlating comprises using pattern matching methods to create a correlation between the data pattern and the one or more matching known signatures.

14. An apparatus for identifying error patterns during automated device testing, the apparatus comprising:
a programmable logic device communicatively coupled to a device under test (DUT) operable to generate commands and data for executing a test on the DUT, wherein the programmable logic device comprises a plurality of programmable capture modules programmed on the programmable logic device, wherein the plurality of programmable capture modules are operable to monitor data traffic between the DUT and the programmable logic device, and wherein the plurality of programmable capture modules are operable to selectively capture data traffic to be monitored; and
a monitoring application controlled by a system controller operable to receive the data traffic captured by the plurality of programmable capture modules and configured to:
based on user input, program the plurality of programmable capture modules;
retrieve results associated with monitoring the data traffic from respective memories associated with each of the plurality of programmable capture modules;
identify a data pattern from the retrieved results;
compare the data pattern with known signatures in a database, wherein the database further includes metadata that associates an error signature of each error with a type of capture module, a method of identification, a cause of error and a suggested action to take in response to the error; and
correlate the data pattern with one or more matching known signatures in the database.

15. The apparatus of claim 14, wherein the monitoring application is further configured to:
assign a score to each of the one or more matching known signatures in the database based a level of correlation with the data pattern.

16. The apparatus of claim 14, wherein the data traffic comprises a flow of traffic between the DUT and the programmable logic device, wherein the plurality of programmable capture modules comprise a plurality of types and are configured using a plurality of stages, and wherein the flow of traffic between the DUT and the programmable logic device is processed through the plurality of stages.

17. The apparatus of claim 14, wherein the monitoring application is further configured to:
- display the data pattern and the cause of error associated with each of the one or more matching known signatures in a graphical user interface (GUI).

18. A tester comprising:
- a system controller for controlling a test program for testing a plurality of devices under test (DUTs);
- a Field Programmable Gate Array (FPGA) operable to interface with and test the plurality of DUTs, the FPGA coupled to the system controller, wherein each FPGA comprises a plurality of capture modules, wherein the plurality of capture modules each include acquisition logic and capture memory, wherein the FPGA includes a transfer interface coupled to the plurality of capture modules, wherein the plurality of capture modules comprise different types and are programmed on the FPGA and operable to monitor data traffic between the plurality of DUTs and the FPGA, and wherein the plurality of capture modules are operable to selectively capture and analyze data traffic to be monitored, wherein the data traffic comprises a flow of traffic between the plurality of DUTs and the FPGA; and
- a monitoring application controlled by the system controller operable to implement a graphical user interface and configured to:
  - based on user input, program the plurality of capture modules;
  - retrieve results associated with monitoring the data traffic from respective capture memories associated with each of the plurality of capture modules;
  - identify a data pattern from the retrieved results;
  - compare the data pattern with known signatures in a database, wherein the database further includes metadata that associates an error signature of each error with a type of capture module, a method of identification, a cause of error and a suggested action to take in response to the error; and
  - correlate the data pattern with one or more matching known signatures in the database.

19. The tester of claim 18, wherein the plurality of capture modules are configured using a plurality of stages, and wherein the flow of traffic between the plurality of DUTs and the FPGA is processed through the plurality of stages.

* * * * *